United States Patent
Yamada et al.

(10) Patent No.: US 11,333,987 B2
(45) Date of Patent: *May 17, 2022

(54) FLUORINE-CONTAINING RESIN PARTICLE, COMPOSITION, LAYER-SHAPED ARTICLE, ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventors: Wataru Yamada, Kanagawa (JP); Masahiro Iwasaki, Kanagawa (JP); Ryosuke Fujii, Kanagawa (JP); Keisuke Kusano, Kanagawa (JP); Yuto Okazaki, Kanagawa (JP); Taisuke Fukui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,363

(22) Filed: Dec. 2, 2019

(65) Prior Publication Data
US 2020/0257210 A1  Aug. 13, 2020

(30) Foreign Application Priority Data

Feb. 7, 2019 (JP) .............................. JP2019-020758
Sep. 24, 2019 (JP) .............................. JP2019-173181

(51) Int. Cl.
| | | |
|---|---|---|
| C08L 27/12 | (2006.01) | |
| G03G 5/07 | (2006.01) | |
| C08F 114/26 | (2006.01) | |
| G03G 5/05 | (2006.01) | |
| C08L 27/20 | (2006.01) | |
| C08L 27/14 | (2006.01) | |
| C08L 27/16 | (2006.01) | |
| C08L 27/18 | (2006.01) | |
| C08K 5/16 | (2006.01) | |
| C08K 5/17 | (2006.01) | |
| G03G 21/18 | (2006.01) | |
| G03G 15/00 | (2006.01) | |

(52) U.S. Cl.
CPC ............ *G03G 5/071* (2013.01); *C08F 114/26* (2013.01); *C08K 5/16* (2013.01); *C08K 5/17* (2013.01); *C08L 27/12* (2013.01); *C08L 27/14* (2013.01); *C08L 27/16* (2013.01); *C08L 27/18* (2013.01); *C08L 27/20* (2013.01); *G03G 5/056* (2013.01); *G03G 15/75* (2013.01); *G03G 21/1803* (2013.01)

(58) Field of Classification Search
CPC .......... C08L 27/12; C08L 27/14; C08L 27/16; C08L 27/18; C08L 27/20; C08K 5/16
See application file for complete search history.

(56) References Cited

U.S. PATENT DOCUMENTS

| | | | |
|---|---|---|---|
| 4,742,122 A * | 5/1988 | Buckmaster | C08F 6/14 525/326.2 |
| 5,115,038 A | 5/1992 | Ihara et al. | |
| 7,553,594 B2 | 6/2009 | Ogaki et al. | |
| 7,838,190 B2 | 11/2010 | Ogaki et al. | |
| 2006/0252898 A1 * | 11/2006 | Tsuji | C08F 14/26 526/250 |
| 2010/0168301 A1 * | 7/2010 | Sawauchi | C08J 3/05 524/186 |
| 2013/0252152 A1 * | 9/2013 | Kawabata | G03G 15/00 430/56 |
| 2019/0023856 A1 | 1/2019 | Yoshida et al. | |
| 2019/0023818 A1 | 12/2019 | Yoshida et al. | |

FOREIGN PATENT DOCUMENTS

| | | |
|---|---|---|
| JP | 4-20507 A | 1/1992 |
| JP | 8-328269 A | 12/1996 |
| JP | 8-328285 A | 12/1996 |
| JP | 2000-26614 A | 1/2000 |
| JP | 2009-104145 A | 5/2009 |
| JP | 2010-202741 A | 9/2010 |
| JP | 2015-18183 A | 1/2015 |
| JP | 2018-24868 A | 2/2018 |
| JP | 2018-24869 A | 2/2018 |

OTHER PUBLICATIONS

Hoffmann et al.; Journal of Applied Polymer Science, 2013, p. 1787-1793.*
Lappan et al.; Macromolecular Materials and Engineering, 2008, vol. 293, p. 538-542.*

\* cited by examiner

*Primary Examiner* — Robert S Jones, Jr.
(74) *Attorney, Agent, or Firm* — Sughrue Mion, PLLC

(57) ABSTRACT

A fluorine-containing resin particle contains 0 or more and 30 or less carboxyl groups per $10^6$ carbon atoms and 0 ppm or more and 3 ppm or less of a basic compound.

14 Claims, 2 Drawing Sheets

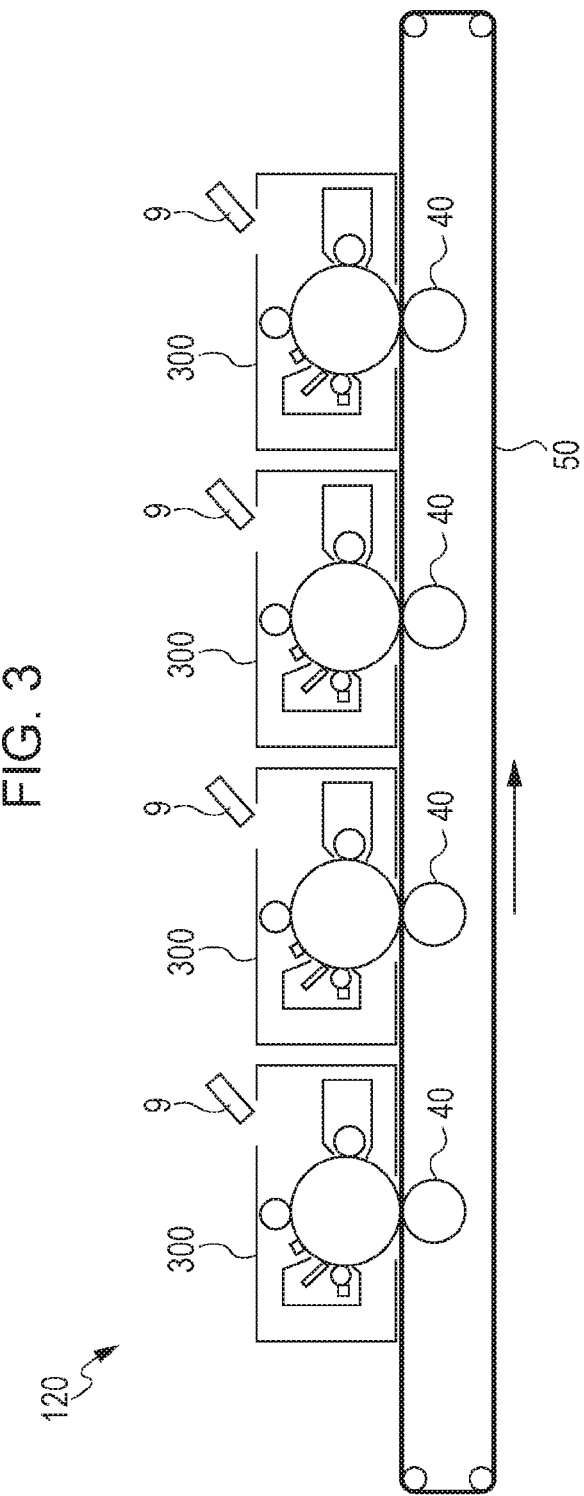

FLUORINE-CONTAINING RESIN PARTICLE, COMPOSITION, LAYER-SHAPED ARTICLE, ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2019-020758 filed Feb. 7, 2019 and Japanese Patent Application No. 2019-173181 filed Sep. 24, 2019.

BACKGROUND

(i) Technical Field

The present disclosure relates to a fluorine-containing resin particle, a composition, a layer-shaped article, an electrophotographic photoreceptor, a process cartridge, and an image forming apparatus.

(ii) Related Art

Fluorine-containing resin particles are, for example, widely used as lubricants and the like. Examples of fluorine-containing resin particles include particles obtained by irradiation and particles obtained by polymerization.

For example, Japanese Unexamined Patent Application Publication No. 2009-104145 discloses an "electrophotographic photoreceptor that includes a photosensitive layer containing fluorine atom-containing resin particles".

Japanese Unexamined Patent Application Publication No. 2018-24869 discloses a "method for producing a low-molecular-weight polytetrafluoroethylene, the method including (1) a step of placing, into a closed vessel, polytetrafluoroethylene, at least one additive selected from the group consisting of a hydrocarbon, a chlorinated hydrocarbon, an alcohol, and a carboxylic acid (however, perfluorocarboxylic acids having 8 or more and 14 or less carbon atoms are excluded), and at least one selected from the group consisting of an inert gas (however, the aforementioned additives are excluded) and an oxygen absorber; and (2) a step of irradiating the polytetrafluoroethylene so as to obtain a low-molecular-weight polytetrafluoroethylene having a complex viscosity at 380° C. of $1\times10^2$ to $7\times10^5$ Pa·s".

Japanese Unexamined Patent Application Publication No. 2018-24868 discloses a "method for producing a low-molecular-weight polytetrafluoroethylene, the method including (1) a step of irradiating polytetrafluoroethylene to obtain a low-molecular-weight polytetrafluoroethylene having a melt viscosity at 380° C. of $1\times10^2$ to $7\times10^5$ Pa·s, (2) a step of crushing the low-molecular-weight polytetrafluoroethylene, and (3) heat-treating the low-molecular-weight polytetrafluoroethylene crushed in the step (2)".

Japanese Unexamined Patent Application Publication No. 2010-202741 discloses a "low-molecular-weight polytetrafluoroethylene obtained by suspension polymerization, in which a powder having a 50% average particle diameter of 3 μm or less as measured with a dry laser and having a particle diameter of 1 μm or less is contained, and the melt viscosity measured at 340° C. by a flow tester method is 2500 Pa·s or less".

Japanese Unexamined Patent Application Publication No. 2000-026614 discloses "a method for producing an ultrafine powder crosslinked polytetrafluoroethylene resin, the method including (a) irradiating a mixed solution of a tetrafluoroethylene monomer and acetone with an ionizing radiation to polymerize the monomer and turn the solution into a gel-state polytetrafluoroethylene-acetone solvent dispersion system, (b) separating polytetrafluoroethylene fine powder from the dispersion system, and (c) irradiating the polytetrafluoroethylene fine powder with an ionizing radiation to induce crosslinking".

SUMMARY

Fluorine-containing resin particles of the related art contain carboxyl groups or basic compounds owing to their production methods, and thus do not exhibit stable charging properties depending on the amounts of the carboxyl groups and basic compounds.

Aspects of non-limiting embodiments of the present disclosure relate to a fluorine-containing resin particle having excellent chargeability compared to when the number of carboxyl groups per $10^6$ carbon atoms exceeds 30 or when the amount of the basic compounds exceeds 3 ppm.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a fluorine-containing resin particle including 0 or more and 30 or less carboxyl groups per $10^6$ carbon atoms; and 0 ppm or more and 3 ppm or less of a basic compound.

BRIEF DESCRIPTION OF THE DRAWINGS

Exemplary embodiments of the present disclosure will be described in detail based on the following figures, wherein:

FIG. 3 is a schematic diagram illustrating another example of the image forming apparatus according to the exemplary embodiment.

DETAILED DESCRIPTION

Figure 1:
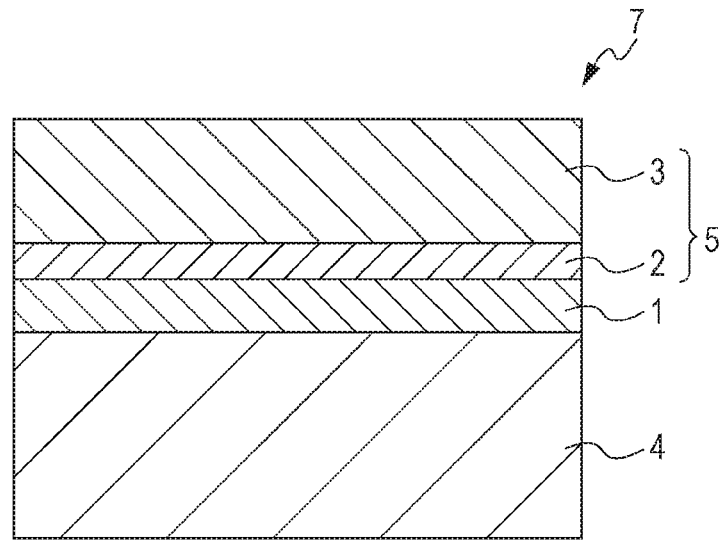
FIG. 1 is a schematic cross-sectional view of one example of the layer structure of an electrophotographic photoreceptor according to an exemplary embodiment.

Exemplary embodiments, which are some of examples of the present disclosure, will now be described in detail.
Fluorine-Containing Resin Particle A fluorine-containing resin particle according to a first exemplary embodiment has 0 or more and 30 or less carboxyl groups per $10^6$ carbon atoms and contains 0 ppm or more and 3 ppm or less of a basic compound.

Due to the above-described features, the fluorine-containing resin particle of this exemplary embodiment exhibits excellent chargeability.

Examples of the fluorine-containing resin particle include particles obtained by irradiation (in this description, also referred to as the "irradiated fluorine-containing resin particles") and particles obtained by polymerization (in this description, also referred to as the "polymerized fluorine-containing resin particles").

The irradiated fluorine-containing resin particles (the fluorine-containing resin particles obtained by irradiation)

refer to fluorine-containing resin particles that have been given a particle form during radiation polymerization, and fluorine-containing resin particles obtained by irradiating a polymerized fluorine-containing resin so as to decompose the resin to reduce the molecular weight and to give a particle form.

The irradiated fluorine-containing resin particles contain many carboxyl groups since large quantities of carboxylic acids occur by irradiation in air.

Meanwhile, polymerized fluorine-containing resin particles (fluorine-containing resin particles obtained by polymerization) refer to fluorine-containing resin particles that have become particles during polymerization such as suspension polymerization or emulsion polymerization and that are not irradiated.

Since polymerized fluorine-containing resin particles are produced by polymerization in the presence of a basic compound, the basic compound is contained as a residue.

In other words, existing fluorine-containing resin particles contain large quantities of carboxyl groups or basic compounds.

When fluorine-containing resin particles contain many carboxyl groups, the particles exhibit ion conductivity and are difficult to charge.

For example, when typical fluorine-containing resin particles containing many carboxyl groups are used in the outermost surface layer of an electrophotographic photoreceptor, the chargeability of the photoreceptor in a high-temperature, high-humidity environment is degraded, and the toner may attach to a non-image region (this phenomenon may hereinafter be referred to as "fogging").

Meanwhile, when fluorine-containing resin particles contain a large amount of basic compounds, the chargeability is degraded because basic compounds exhibit a hole-trapping property.

For example, when typical fluorine-containing resin particles containing a large amount of basic compounds are used in the outermost surface layer of an electrophotographic photoreceptor, the residual potential may increase over time and the image density may be degraded.

Thus, in the fluorine-containing resin particle of this exemplary embodiment, the quantities of the carboxyl groups and basic compounds are suppressed within the aforementioned ranges to improve chargeability. Note that as long as the number of carboxyl groups and the amount of the basic compounds are suppressed within the aforementioned ranges, even when the number of carboxyl groups is relatively large, the chargeability tends to improve by using a relatively large amount of the basic compounds since conductivity and the hole-trapping property cancel out each other.

Thus, for example, when the fluorine-containing resin particle of the exemplary embodiment is used in the outermost surface layer of the electrophotographic photoreceptor, fogging and a decrease in image density caused by an increase in residual potential are suppressed.

A fluorine-containing resin particle according to a second exemplary embodiment is a polymerized fluorine-containing resin particle, and contains 0 ppm or more and 3 ppm or less of a basic compound.

The fluorine-containing resin particle of the second exemplary embodiment is a polymerized fluorine-containing resin particle, in other words, a fluorine-containing resin particle that has become a particle during polymerization such as suspension polymerization or emulsion polymerization and that is not irradiated; thus, the amount of the carboxylic acids generated is small, and little, if any, carboxyl groups are contained. In addition, the amount of the basic compound is reduced.

Thus, the fluorine-containing resin particle of the second exemplary embodiment also has high chargeability.

The fluorine-containing resin particle of this exemplary embodiment will now be described in detail.

The fluorine-containing resin particle of this exemplary embodiment contains no or few, if any, carboxyl groups. Specifically, the number of the carboxyl groups in the fluorine-containing resin particle is 0 or more and 30 or less per $10^6$ carbon atoms and, from the viewpoint of improving the chargeability, is preferably 0 or more and 20 or less.

The carboxyl groups in the fluorine-containing resin particle are, for example, carboxyl groups derived from the terminal carboxylic acid contained in the fluorine-containing resin particle.

Examples of the method for reducing the number of carboxyl groups in the fluorine-containing resin particle include 1) a method that does not apply radiation during the process of producing particles, and 2) a method in which irradiation is performed in the absence of oxygen or under a reduced oxygen concentration condition.

The number of carboxyl groups in the fluorine-containing resin particles is measured as follows according to the disclosure in Japanese Unexamined Patent Application Publication No. 4-20507 or the like.

Fluorine-containing resin particles are pre-formed by a pressing machine into a film having a thickness of about 0.1 mm. An infrared absorption spectrum of the prepared film is measured. An infrared absorption spectrum of fluorine-containing resin particles in which carboxylic acid terminals are completely fluorinated by allowing the fluorine-containing resin particles to contact fluorine gas is also measured, and the number of terminal carboxyl groups is determined from the following formula from the difference between the two spectra:

$$\text{number of terminal carboxyl groups (per } 10^6 \text{ carbon atoms)} = (l \times K)/t$$

l: absorbance
K: correction factor
t: thickness (mm) of film

The absorption wavenumber of the carboxyl group is assumed to be 3560 $cm^{-1}$, and the correction factor is assumed to be 440.

The fluorine-containing resin particle of this exemplary embodiment contains no or little, if any, basic compound. Specifically, the amount of the basic compound in the fluorine-containing resin particle is 0 ppm or more and 3 ppm or less, and from the viewpoint of improving chargeability, is preferably 0 ppm or more and 1.5 ppm or less and more preferably 0 ppm or more and 1.2 ppm or less. The ppm is on a mass basis.

Examples of the basic compounds in the fluorine-containing resin particles include 1) basic compounds derived from a polymerization initiator used in polymerization and particle formation of the fluorine-containing resin particles, 2) basic compounds used in the agglomerating process following the polymerization, and 3) basic compounds used as a dispersion aid for stabilizing the dispersion after the polymerization.

Examples of the basic compounds include amine compounds, hydroxides of alkali metals and alkaline earth metals, oxides of alkali metals and alkaline earth metals, and acetic acid salts (in particular, amine compounds).

Examples of the basic compounds are basic compounds having a boiling point (boiling point at normal pressure (1 atm)) of 40° C. or more and 130° C. or less (preferably 50° C. or more and 110° C. or less and more preferably 60° C. or more and 90° C. or less).

Examples of the amine compound include primary amine compounds, secondary amine compounds, and tertiary amine compounds.

Examples of the primary amine compound include methylamine, ethylamine, propylamine, isopropylamine, n-butylamine, isobutylamine, t-butylamine, hexylamine, 2-ethylhexylamine, secondary butylamine, allylamine, and methylhexylamine.

Examples of the secondary amine compound include dimethylamine, diethylamine, di-n-propylamine, diisopropylamine, di-n-butylamine, diisobutylamine, di-t-butylamine, dihexylamine, di(2-ethylhexyl)amine, N-isopropyl-N-isobutylamine, di-secondary butylamine, diallylamine, N-methylhexylamine, 3-pipecoline, 4-pipecoline, 2,4-lupetidine, 2,6-lupetidine, 3,5-lupetidine, morpholine, and N-methylbenzylamine.

Examples of the tertiary amine compound include trimethylamine, triethylamine, tri-n-propylamine, triisopropylamine, tri-n-butylamine, triisobutylamine, tri-t-butylamine, trihexylamine, tri (2-ethylhexyl)amine, N-methylmorpholine, N,N-dimethylallylamine, N-methyldiallylamine, triallylamine, N,N,N',N'-tetramethyl-1,2-diaminoethane, N,N,N',N'-tetramethyl-1,3-diaminopropane, N,N,N',N'-tetraallyl-1,4-diaminobutane, N-methylpiperidine, pyridine, 4-ethylpyridine, N-propyldiallylamine, 3-dimethylaminopropanol, 2-ethylpyrazine, 2,3-dimethylpyrazine, 2,5-dimethylpyrazine, 2,4-lutidine, 2,5-lutidine, 3,4-lutidine, 3,5-lutidine, 2,4,6-collidine, 2-methyl-4-ethylpyridine, 2-methyl-5-ethylpyridine, N,N,N',N'-tetramethylhexamethylenediamine, N-ethyl-3-hydroxypiperidine, 3-methyl-4-ethylpyridine, 3-ethyl-4-methylpyridine, 4-(5-nonyl)pyridine, imidazole, and N-methylpiperazine.

Examples of the hydroxides of alkali metals and alkaline earth metals include NaOH, KOH, $Ca(OH)_2$, $Mg(OH)_2$, and $Ba(OH)_2$.

Examples of the oxides of alkali metals and alkaline earth metals include CaO and MgO.

Examples of the acetic acid salts include zinc acetate and sodium acetate.

Examples of the method for reducing the amount of basic compounds in the fluorine-containing resin particles include 1) a method that involves washing with water, an organic solvent (an alcohol such as methanol, ethanol, or isopropanol, tetrahydrofuran, or the like), or the like after particles are formed, and 2) a method that involves heating (for example, heating to 200° C. or more and 250° C. or less) particles after the particles are formed to remove basic compounds by decomposition and evaporation.

The amount of the basic compounds in the fluorine-containing resin particles is measured as follows.
Pretreatment In the case where a layer-shaped article containing fluorine-containing resin particles is the subject of the measurement, the layer-shaped article is immersed in a solvent (for example, tetrahydrofuran) to dissolve substances other than those insoluble in the solvent and fluorine-containing resin particles, the obtained solution is then added to pure water dropwise, and precipitates are separated by filtration. A solution containing perfluorooctanoic acid (PFOA) obtained during this process is collected. The insoluble matter obtained by filtration is further dissolved in a solvent, the resulting solution is added to pure water dropwise, and precipitates are separated by filtration. This operation is performed five times to obtain fluorine-containing resin particles used as a measurement sample.

In the case where a composition containing fluorine-containing resin particles is the subject of the measurement, the same processes as with the layer-shaped article are performed on the composition to obtain fluorine-containing resin particles used as a measurement sample.

In the case where the fluorine-containing resin particles are directly the subject of the measurement, the same processes as with the layer-shaped article are performed on the fluorine-containing resin particles to obtain fluorine-containing resin particles used as a measurement sample.
Measurement Meanwhile, basic compound solutions (methanol solvent) with known concentrations are subjected to gas chromatography to obtain a calibration curve (calibration curve from 0 ppm to 100 ppm) from the values of the basic compound concentrations and the peak areas of the basic compound solutions (methanol solvent) having known concentrations.

Then measurement sample is measured by gas chromatography to calculate the amount of the basic compounds in the fluorine-containing resin particles from the obtained peak area and the calibration curve. The measurement conditions are as follows.

Measurement Conditions
Headspace sampler: HP7694 produced by HP
Measurement instrument: gas chromatograph (HP6890 series produced by HP)
Detector: hydrogen flame ionization detector (FID)
Column: HP19091S-433 produced by HP
Sample heating time: 10 min
Split ratio: 300:1
Flow rate: 1.0 ml/min
Column temperature elevation setting: 60° C. (3 min), 60° C./min, 200° C. (1 min)

From the viewpoint of improving chargeability, in the fluorine-containing resin particles of this exemplary embodiment, the amount of perfluorooctanoic acid (hereinafter may also be referred to as "PFOA") relative to the fluorine-containing resin particles is preferably 0 ppb or more and 25 ppb or less, preferably 0 ppb or more and 20 ppb or less, and more preferably 0 ppb or more and 15 ppb or less. Here, the "ppb" is on a mass basis.

Since PFOA is used or is generated as a by-product during the process of producing the fluorine-containing resin particles (in particular, fluorine-containing resin particles such as polytetrafluoroethylene particles, modified polytetrafluoroethylene particles, and perfluoroalkylene ether/tetrafluoroethylene copolymer particles), the fluorine-containing resin particles often contain PFOA.

PFOA contains carboxyl groups, which degrade chargeability of the particles. Thus, the fluorine-containing resin particles may contain no or little, if any, PFOA.

An example of the method for reducing the amount of PFOA is a method that involves thoroughly washing the fluorine-containing resin particles with pure water, alkaline water, an alcohol (methanol, ethanol, isopropanol, or the like), a ketone (acetone, methyl ethyl ketone, methyl isobutyl ketone, or the like), an ester (ethyl acetate or the like), or any other common organic solvent (toluene, tetrahydrofuran, or the like). Washing may be performed at room temperature, but washing under heating improves efficiency.

The amount of PFOA is a value measured by the following method.

Pretreatment of Sample

In the case where a layer-shaped article containing fluorine-containing resin particles is the subject of the measurement, the layer-shaped article is immersed in a solvent (for example, tetrahydrofuran) to dissolve substances other than those insoluble in the solvent and fluorine-containing resin particles, the obtained solution is then added to pure water dropwise, and precipitates are separated by filtration. A solution containing perfluorooctanoic acid (PFOA) obtained during this process is collected. The insoluble matter obtained by filtration is further dissolved in a solvent, the resulting solution is added to pure water dropwise, and precipitates are separated by filtration. Collection of the solution containing PFOA obtained as a result is performed five times, and the aqueous solution collected in all collection operations is used as a pretreated aqueous solution.

In the case where a composition containing fluorine-containing resin particles is the subject of the measurement, the same processes as with the layer-shaped article are performed on the composition to obtain a pretreated aqueous solution.

In the case where the fluorine-containing resin particles are directly the subject of the measurement, the same processes as with the layer-shaped article are performed on the fluorine-containing resin particles to obtain a pretreated aqueous solution.

Measurement

A sample solution is prepared from the pretreated aqueous solution obtained as described above and is adjusted and measured in accordance with the method indicated in "Analysis of Perfluorooctanesulfonic Acid (PFOS) and Perfluorooctanoic Acid (PFOA) in Environmental Water, Sediment, and Living Organisms" by Environment and Health Laboratory of Iwate Prefecture.

Examples of the fluorine-containing resin particles of this exemplary embodiment include particles of a fluoroolefin homopolymer, and particles of a copolymer of two or more monomers which are at least one fluoroolefin monomer and a non-fluorine-based monomer (monomer free of fluorine atoms).

Examples of the fluoroolefin include perhaloolefins such as tetrafluoroethylene (TFE), perfluorovinylether, hexafluoropropylene (HFP), and chlorotrifluoroethylene (CTFE), and non-perfluoroolefins such as vinylidene fluoride (VdF), trifluoroethylene, and vinyl fluoride. Among these, VdF, TFE, CTFE, HFP, or the like may be used.

Examples of the non-fluorine-based monomers include hydrocarbon-based olefins such as ethylene, propylene, and butene; alkyl vinyl ethers such as cyclohexyl vinyl ether (CHVE), ethyl vinyl ether (EVE), butyl vinyl ether, and methyl vinyl ether; alkenyl vinyl ethers such as polyoxyethylene allyl ether (POEAE) and ethyl allyl ether; organosilicon compounds having a reactive α,β-unsaturated group such as vinyltrimethoxysilane (VSi), vinyltriethoxysilane, and vinyltris(methoxyethoxy)silane; acrylic esters such as methyl acrylate and ethyl acrylate; methacrylic esters such as methyl methacrylate and ethyl methacrylate; and vinyl esters such as vinyl acetate, vinyl benzoate, and "Beova" (trade name, vinyl ester manufactured by Shell). Among these, alkyl vinyl ether, allyl vinyl ether, vinyl ester, and an organosilicon compound having a reactive α,β-unsaturated group may be used.

Among these, particles having a high fluorination ratio may be used as the fluorine-containing resin particles. Particles of polytetrafluoroethylene (PTFE), a tetrafluoroethylene-hexafluoropropylene copolymer (FEP), a tetrafluoroethylene-perfluoro(alkyl vinyl ether) copolymer (PFA), an ethylene-tetrafluoroethylene copolymer (ETFE), an ethylene-chlorotrifluoroethylene copolymer (ECTFE), and the like are more preferable, and particles of PTFE, FEP, and PFA are particularly preferable.

The fluorine-containing resin particles of this exemplary embodiment may be polymerized fluorine-containing resin particles. As mentioned above, the polymerized fluorine-containing resin particles are formed into particles during polymerization such as suspension polymerization or emulsion polymerization, and are not irradiated.

An example of the method for preparing fluorine-containing resin particles by suspension polymerization involves suspending, in a dispersion medium, a monomer that forms a fluorine-containing resin, and additives such as a polymerization initiator and a catalyst, and then forming particles of a polymer while polymerizing the monomer.

An example of the method for preparing fluorine-containing resin particles by emulsion polymerization involves emulsifying, in a dispersion medium, a monomer that forms a fluorine-containing resin, and additives such as a polymerization initiator and a catalyst by using a surfactant (namely, an emulsifier), and then forming particles of a polymer while polymerizing the monomer.

In particular, the fluorine-containing resin particles may be particles obtained without performing irradiation in the production process.

However, irradiated fluorine-containing resin particles that have been irradiated in the absence of oxygen or under a reduced oxygen concentration condition may be used as the fluorine-containing resin particles.

The average particle diameter of the fluorine-containing resin particles of this exemplary embodiment is not particularly limited, but is preferably 0.2 μm or more and 4.5 μm or less and more preferably 0.2 μm or more and 4 μm or less. Fluorine-containing resin particles having an average particle diameter of 0.2 μm or more and 4.5 μm or less (in particular, fluorine-containing resin particles such as PTFE particles and the like) have a tendency to contain a large amount of PFOA. Thus, fluorine-containing resin particles having an average particle diameter of 0.2 μm or more and 4.5 μm or less tend to exhibit low chargeability. However, limiting the amount of PFOA to be within the above-described range improves chargeability of even fluorine-containing resin particles having an average particle diameter of 0.2 μm or more and 4.5 μm or less.

The average particle diameter of the fluorine-containing resin particles is the value measured by the following method.

Using a scanning electron microscope (SEM), particles are observed at a magnification of, for example, 5000× or more, the maximum diameters of the fluorine-containing resin particles (secondary particles formed by agglomeration of primary particles) are measured, and the average of fifty particles is used as the average particle diameter of the fluorine-containing resin particles. The SEM used is JSM-6700F produced by JEOL Ltd., and a secondary electron image at an accelerating voltage of 5 kV is observed.

The specific surface area (BET specific surface area) of the fluorine-containing resin particles of this exemplary embodiment is preferably 5 $m^2/g$ or more and 15 $m^2/g$ or less and more preferably 7 $m^2/g$ or more and 13 $m^2/g$ or less from the viewpoint of dispersion stability.

The specific surface area is a value measured by a BET-type specific surface area meter (FlowSorb II2300 produced by Shimadzu Corporation) by a nitrogen substitution method.

The apparent density of the fluorine-containing resin particles of this exemplary embodiment is preferably 0.2 g/ml or more and 0.5 g/ml or less and more preferably 0.3 g/ml or more and 0.45 g/ml or less from the viewpoint of dispersion stability.

The apparent density is a value measured in accordance with JIS K 6891 (1995).

The melting temperature of the fluorine-containing resin particle of this exemplary embodiment is preferably 300° C. or more and 340° C. or less and more preferably 325° C. or more and 335° C. or less.

The melting temperature is a melting point measured in accordance with JIS K 6891 (1995).

The fluorine-containing resin particles of this exemplary embodiment may have a fluorine atom-containing dispersant (hereinafter may be referred to as the "fluorine-containing dispersant) attached to surfaces thereof.

Examples of the fluorine-containing dispersant include polymers obtained by homopolymerization or copolymerization of polymerizable compounds having fluorinated alkyl groups (hereinafter these polymers may be referred to as "fluorinated alkyl group-containing polymers").

Specific examples of the fluorine-containing dispersant include homopolymers of (meth)acrylates having fluorinated alkyl groups, and random or block copolymers obtained from (meth)acrylates having fluorinated alkyl groups and fluorine atom-free monomers. Note that (meth)acrylates refer to both acrylates and methacrylates.

Examples of the (meth)acrylates having fluorinated alkyl groups include 2,2,2-trifluoroethyl(meth)acrylate and 2,2,3,3,3-pentafluoropropyl(meth)acrylate.

Examples of the fluorine atom-free monomers include (meth)acrylate, isobutyl(meth)acrylate, t-butyl(meth)acrylate, isooctyl(meth)acrylate, lauryl(meth)acrylate, stearyl(meth)acrylate, isobornyl(meth)acrylate, cyclohexyl(meth)acrylate, 2-methoxyethyl(meth)acrylate, methoxytriethylene glycol(meth)acrylate, 2-ethoxyethyl(meth)acrylate, tetrahydrofurfuryl(meth)acrylate, benzyl(meth)acrylate, ethylcarbitol(meth)acrylate, phenoxyethyl(meth)acrylate, 2-hydroxy(meth)acrylate, 2-hydroxypropyl(meth)acrylate, 4-hydroxybutyl(meth)acrylate, methoxypolyethylene glycol(meth)acrylate, phenoxypolyethylene glycol(meth)acrylate, hydroxyethyl-o-phenylphenol(meth)acrylate, and o-phenylphenol glycidyl ether(meth)acrylate.

Other specific examples of the fluorine-containing dispersant include block or branched polymers disclosed in the U.S. Pat. No. 5,637,42 and Japanese Patent No. 4251662. Other specific examples of the fluorine-containing dispersant include fluorine-based surfactants.

Among these, the fluorine-containing dispersant is preferably a fluorinated alkyl group-containing polymer having a structural unit represented by general formula (FA) below and is more preferably a fluorinated alkyl group-containing polymer having a structural unit represented by general formula (FA) below and a structural unit represented by general formula (FB) below.

In the description below, the fluorinated alkyl group-containing polymer having a structural unit represented by general formula (FA) below and a structural unit represented by general formula (FB) below is described.

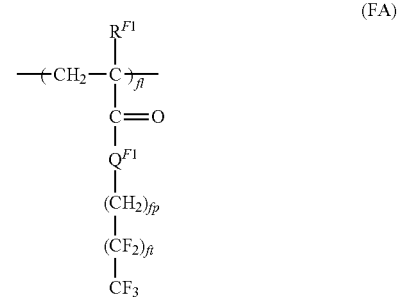

(FA)

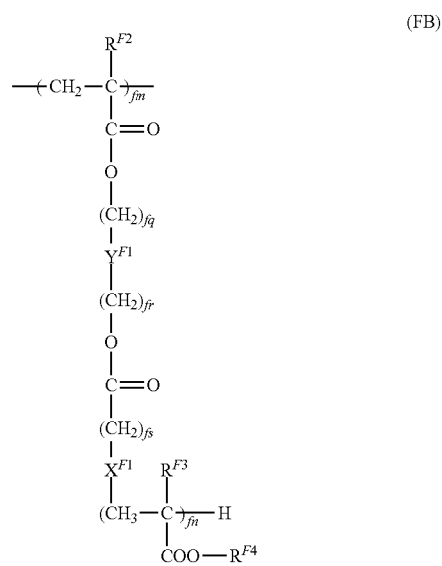

(FB)

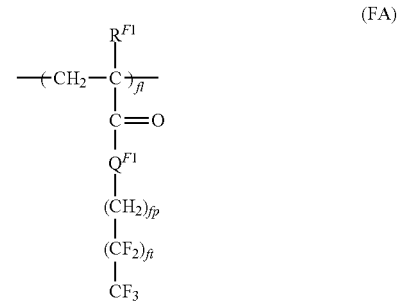

(FA)

-continued

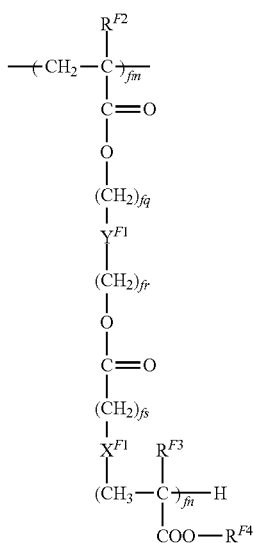

(FB)

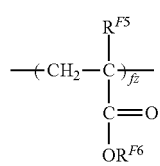

(FC)

In general formulae (FA) and (FB), $R^{F1}$, $R^{F2}$, $R^{F3}$, and $R^{F4}$ each independently represent a hydrogen atom or an alkyl group, $X^{F1}$ represents an alkylene chain, a halogen-substituted alkylene chain, —S—, —O—, —NH—, or a single bond, $Y^{F1}$ represents an alkylene chain, a halogen-substituted alkylene chain, —($C_{fx}H_{2fx-1}$(OH))—, or a single bond, $Q^{F1}$ represents —O— or —NH—, fl, fm, and fn each independently represent an integer of 1 or more, fp, fq, fr, and fs each independently represent 0 or an integer of 1 or more, ft represents an integer of 1 or more and 7 or less, and fx represents an integer of 1 or more.

In general formulae (FA) and (FB), a hydrogen atom, a methyl group, an ethyl group, a propyl group, etc., are preferable as the groups represented by $R^{F1}$, $R^{F2}$, $R^{F3}$, and $R^{F4}$. A hydrogen atom and a methyl group are more preferable, and a methyl group is yet more preferable.

In general formulae (FA) and (FB), linear or branched alkylene groups having 1 to 10 carbon atoms may be used as the alkylene chains (unsubstituted alkylene chains and halogen-substituted alkylene chains) represented by $X^{F1}$ and $Y^{F1}$.

In —($C_{fx}H_{2fx-1}$(OH))— represented by $Y^{F1}$, fx may represent an integer of 1 or more and 10 or less.

Furthermore, fp, fq, fr, and fs may each independently represent 0 or an integer of 1 or more and 10 or less.

For example, fn may be 1 or more and 60 or less.

In the fluorine-containing dispersant, the ratio of the structural unit represented by general formula (FA) to the structural unit represented by general formula (FB), in other words, fl:fm, may be in the range of 1:9 to 9:1 or may be in the range of 3:7 to 7:3.

The fluorine-containing dispersant may further contain a structural unit represented by general formula (FC) in addition to the structural unit represented by general formula (FA) and the structural unit represented by general formula (FB). The content ratio (fl+fm:fz) of the total (fl+fm) of the structural units represented by general formulae (FA) and (FB) to the structural unit represented by general formula (FC) is preferably in the range of 10:0 to 7:3 and is more preferably in the range of 9:1 to 7:3.

In general formula (FC), $R^{F5}$ and $R^{F6}$ each independently represent a hydrogen atom or an alkyl group. Furthermore, fz represents an integer of 1 or more.

In general formula (FC), a hydrogen atom, a methyl group, an ethyl group, a propyl group, etc., are preferable as the groups represented by $R^{F5}$ and $R^{F6}$. A hydrogen atom and a methyl group are more preferable, and a methyl group is yet more preferable.

Examples of the commercially available products of the fluorine-containing dispersant include GF300 and GF400 (produced by Toagosei Co, Ltd.), Surflon series (produced by AGC SEIMI CHEMICAL CO., LTD.), Ftergent series (produced by NEOS Company Limited), PF series (produced by Kitamura Chemicals Co., Ltd.), Megaface series (produced by DIC Corporation), and FC series (produced by 3M).

The weight-average molecular weight Mw of the fluorine-containing dispersant is preferably 20,000 or more and 200,000 or less and more preferably 50,000 or more and 200,000 or less from the viewpoint of improving the dispersibility of the fluorine-containing resin particles.

The weight-average molecular weight of the fluorine-containing dispersant is a value measured by gel permeation chromatography (GPC). The molecular weight measurement by GPC is conducted by, for example, using GPC·HLC-8120 produced by TOSOH CORPORATION as a measurement instrument with TSKgel GMHHR-M+TSKgel GMHHR-M columns (7.8 mm I.D., 30 cm) produced by TOSOH CORPORATION and a chloroform solvent, and calculating the molecular weight from the measurement results by using a molecular weight calibration curve prepared from a monodisperse polystyrene standard sample.

The amount of the fluorine-containing dispersant contained relative to, for example, the fluorine-containing resin particles is preferably 0.5 mass % or more and 10 mass % or less and more preferably 1 mass % or more and 7 mass % or less.

The fluorine-containing dispersants may be used alone or in combination.

Here, examples of the method for attaching a fluorine-containing dispersant to the fluorine-containing resin particles of this exemplary embodiment include the followings:

1) A method that involves adding fluorine-containing resin particles and a fluorine-containing dispersant to a dispersion medium to prepare a dispersion of the fluorine-containing resin particles and then removing the dispersion medium from the dispersion.

2) A method that involves mixing fluorine-containing resin particles and a fluorine-containing dispersant in a dry-type power mixer to attach the fluorine-containing dispersant to the fluorine-containing resin particles.

3) A method that involves adding a fluorine-containing dispersant dissolved in a solvent to fluorine-containing resin particles dropwise while stirring and then removing the solvent.

One example of the fluorine-containing dispersant is a fluorine-based graft polymer (hereinafter may be referred to as a "particular fluorine-based graft polymer"), in which, in an infrared absorption spectrum, the ratio of a peak area in a wavenumber range of 1020 cm$^{-1}$ to 1308 cm$^{-1}$ to a peak area in an wavenumber range of 1673 cm$^{-1}$ to 1779 cm$^{-1}$ is 2.7 or more and 4.8 or less.

When the fluorine-containing resin particles having this particular fluorine-based graft polymer attached to the surfaces thereof are contained in the outermost surface layer of an electrophotographic photoreceptor, local degradation of the cleaning property is suppressed. The reason behind this is presumably as follows.

Heretofore, in order to improve the cleaning property, fluorine-containing resin particles have been blended into the surface layer of an electrophotographic photoreceptor. In order to improve dispersibility of the fluorine-containing resin particles, a dispersant, such as a fluorine-based graft polymer, is used.

However, even when the dispersibility of the fluorine-containing resin particles is improved by blending a dispersant as well as fluorine-containing resin particles into a coating solution for forming a surface layer of an electrophotographic photoreceptor, the dispersibility is degraded over time, and settling or re-aggregation of the fluorine-containing resin particles may occur.

When a surface layer of an electrophotographic photoreceptor is formed by using a coating solution with degraded fluorine-containing resin particle dispersibility, the dispersibility of the fluorine-containing resin particles in the surface layer is degraded, and local cleaning failure may occur. Moreover, after application of the coating solution, the dispersibility of the fluorine-containing resin particles may become degraded due to the changes in component concentrations caused by drying of the coating film or the like, and the local cleaning property may thereby be degraded.

The fluorine-based graft polymer used as the dispersant contains a fluorine component (specifically, a fluorinated alkyl group or the like) that readily and strongly interacts with the fluorine-containing resin particles. Meanwhile, the fluorine-based graft polymer has an ester skeleton (that is, $>C=O$) serving as a polar group in the polymer, and this ester skeleton readily and strongly interacts with a vehicle (specifically, a binder resin such as a polycarbonate resin or a polyarylate resin, and a solvent) in the coating solution.

The dispersion stability of the fluorine-containing resin particles achieved by the fluorine-based graft polymer is referred to as stabilization caused by steric hindrance, and is determined on the basis of the balance between the affinity between the fluorine-based graft polymer and the fluorine-containing resin particles and the affinity between the fluorine-based graft polymer and the vehicle in the coating solution.

When the affinity between the fluorine-based graft polymer and the fluorine-containing resin particles is excessively higher than the affinity between the fluorine-based graft polymer and the vehicle in the coating solution, the fluorine-based graft polymer attached to the fluorine-containing resin particles does not dissolve and spread in the dispersion liquid, and the fluorine-containing resin particle stability achieved by steric hindrance caused by the fluorine-based graft polymer tends to be degraded.

Meanwhile, when the affinity between the fluorine-based graft polymer and the fluorine-containing resin particles is excessively lower than the affinity between the fluorine-based graft polymer and the vehicle in the coating solution, the fluorine-based graft polymer does not easily attach to the fluorine-containing resin particles and does not sufficiently exhibit the dispersant function.

Under such conditions, for example, the dispersibility of the fluorine-containing resin particles is degraded over time due to the mechanical load caused by circulation of the surface layer-forming coating solution, temperature changes during storage of the coating solution, changes in components in the coating solution, such as evaporation of the solvent, over time, changes in component concentrations during drying of the coating film formed of the coating solution, etc. As a result, settling or re-aggregation of the fluorine-containing resin particles tends to occur.

As a result, the dispersibility of the fluorine-containing particles in the surface layer of an electrophotographic photoreceptor is degraded, density nonuniformity of the fluorine-containing resin particles is generated in the surface layer of the photoreceptor, and local cleaning failure may occur in portions where the fluorine-containing resin particle concentrations are low.

In contrast, the particular fluorine-based graft polymer has a peak in the wavenumber range of 1020 cm$^{-1}$ to 1308 cm$^{-1}$, and this peak corresponds to the peak derived from the fluorine component in the fluorine-based graft polymer. In other words, this peak area corresponds to the fluorine component content of the fluorine-based graft polymer.

In contrast, the peak in the wavenumber range of 1673 cm$^{-1}$ to 1779 cm$^{-1}$ corresponds to the peak derived from the ester skeleton (in other words, $>C=O$) of the fluorine-based graft polymer. In other words, this peak area corresponds to the ester skeleton content of the fluorine-based graft polymer.

Thus, the ratio between these peak areas corresponds to the ratio of the fluorine component content to the ester skeleton content of the fluorine-based graft polymer.

When this peak area ratio (peak area in the wavenumber range of 1020 cm$^{-1}$ to 1308 cm$^{-1}$/peak area in the wavenumber range of 1673 cm$^{-1}$ to 1779 cm$^{-1}$) is within the aforementioned range, the affinity between the fluorine-based graft polymer and the fluorine-containing resin particles and the affinity between the fluorine-based graft polymer and the vehicle in the coating solution become well balanced. Balancing the affinity ensures the adhesion force of the fluorine-based graft polymer to the fluorine-containing resin particles and secures the affinity of the fluorine-based graft polymer to the vehicle in the coating solution. Thus, the fluorine-containing resin particles are stabilized by the steric hindrance caused by the fluorine-based graft polymer.

Thus, degradation of the dispersibility of the fluorine-containing resin particles over time is suppressed despite occurrence of the mechanical load caused by circulation of the surface layer-forming coating solution, temperature changes during storage of the coating solution, changes in components of the coating solution, such as evaporation of the solvent, over time, changes in component concentrations during drying of the coating film formed of the coating solution, etc. Thus, settling or re-aggregation of the fluorine-containing resin particles is inhibited.

As a result, the dispersibility of the fluorine-containing resin particles in the surface layer of the photoreceptor is improved, and local cleaning failure is suppressed.

For the particular fluorine-based graft polymer, the peak area ratio (peak area in the wavenumber range of 1020 cm$^{-1}$ to 1308 cm$^{-1}$/peak area in the wavenumber range of 1673 cm$^{-1}$ to 1779 cm$^{-1}$) is preferably 2.8 or more and 4.8 or less and more preferably 3.5 or more and 4.8 or less from the viewpoint of suppressing local degradation of the cleaning property.

The infrared absorption spectrum of the particular fluorine-based graft polymer is measured by the following method.

First, a fluorine-based graft polymer to be measured is prepared into a fine powder or a film so as to prepare a measurement sample for the attenuated total reflection (ATR) method. Next, the measurement sample is analyzed with an infrared spectrophotometer (FT/IR-6100 produced by JASCO equipped with an ATR unit and ZnSe window) under the conditions of number of runs: 64 and resolution: 4 cm$^{-1}$ so as to measure the wavenumber range of 650 cm$^{-1}$ to 4000 cm$^{-1}$. The results are subjected to ATR correction to obtain an infrared absorption spectrum.

The peak area in the wavenumber range of 1673 cm$^{-1}$ to 1779 cm$^{-1}$ is determined as the carbonyl groups in the fluorine-based graft polymer.

Similarly, the peak area in the wavenumber range of 1020 cm$^{-1}$ to 1308 cm$^{-1}$ is determined as the sum of the C—F groups and C—O—C groups in the fluorine-based graft polymer.

When the infrared absorption spectrum of the fluorine-based graft polymer is to be measured from the outermost surface layer containing the particular fluorine-based graft polymer, the fluorine-based graft polymer to be used as the measurement sample is prepared as follows.

The outermost surface layer is dissolved in a dissolving solvent such as tetrahydrofuran, and the fluorine-containing fine particles are filtered with a 0.1 μm mesh filter. Next, the fluorine-containing fine particles obtained by filtering are heated in one solvent or a mixture of two or more solvents selected from aromatic hydrocarbons such as toluene and xylene, halogen solvents such as fluorocarbon, perfluorocarbon, hydrochlorofluorocabon, methylene chloride, and chloroform, ester solvents such as ethyl acetate and butyl acetate, and ketone solvents such as acetone, methyl ethyl ketone, methyl isobutyl ketone, and cyclopentanone, at a temperature of 100° C. or lower, filtered, and dried so as to separate and obtain the fluorine-based graft polymer that have been adhered to the fluorine-containing fine particle surfaces.

Examples of the fluorine-based graft polymer that has the aforementioned peak area ratio include polymers obtained by copolymerizing at least a polymerizable compound having a fluorinated alkyl group and a polymerizable group having no fluorinated alkyl group but an ester group. A fluorine-based graft polymer having the aforementioned peak area ratio is obtained by adjusting the weight ratio between these two types of polymerizable compounds.

Specific examples of the particular fluorine-based graft polymer include random or block copolymers between a (meth)acrylate having a fluorinated alkyl group and a monomer having no fluorinated alkyl group but an ester group (>C═O). Note that (meth)acrylates refer to both acrylates and methacrylates.

Examples of the (meth)acrylates having fluorinated alkyl groups include 2,2,2-trifluoroethyl(meth)acrylate and 2,2,3,3,3-pentafluoropropyl(meth)acrylate.

Examples of the monomer having no fluorinated alkyl group but an ester group (>C═O) include (meth)acrylates such as methoxypolyethylene glycol(meth)acrylate and phenoxypolyethylene glycol(meth)acrylate.

In particular, the particular fluorine-based graft polymer may be a fluorinated alkyl group-containing polymer that has a structural unit represented by general formula (FA) above and a structural unit represented by general formula (FB) above.

Here, in the particular fluorine-based graft polymer, the ratio of the structural unit represented by general formula (FA) to the structural unit represented by general formula (FB), in other words, fl:fm, is preferably in the range of 1:9 to 9:1 and more preferably in the range of 3:7 to 7:3.

The particular fluorine-based graft polymer may further contain a structural unit represented by general formula (FC) above in addition to the structural unit represented by general formula (FA) and the structural unit represented by general formula (FB). The content ratio (fl+fm:fz) of the total (fl+fm) of the structural units represented by general formulae (FA) and (FB) to the structural unit represented by general formula (FC) is preferably in the range of 10:0 to 7:3 and is more preferably in the range of 9:1 to 7:3.

The weight-average molecular weight Mw of the particular fluorine-based graft polymer is preferably 20,000 or more and 200,000 or less, more preferably 50,000 or more and 200,000 or less, and yet more preferably 80,000 or more and 150,000 or less from the viewpoint of improving the fluorine-containing resin particle dispersibility (in other words, from the viewpoint of suppressing local degradation of the cleaning property).

Composition

A composition according to an exemplary embodiment contains the fluorine-containing resin particle according to an exemplary embodiment.

The composition of this exemplary embodiment may contain a fluorine-containing dispersant. The composition containing the fluorine-containing dispersant may be a composition prepared by mixing preliminarily prepared fluorine-containing-dispersant-attached fluorine-containing resin particles and other components (for example, a dispersion medium and resin particles other than the fluorine-containing resin particles) or may be a composition prepared by separately mixing fluorine-containing resin particles, a fluorine-containing dispersant, and other components (for example, a dispersion medium and resin particles other than the fluorine-containing resin particles).

The composition of the exemplary embodiment may be a liquid composition or a solid composition.

Examples of the liquid composition include a fluorine-containing resin particle dispersion containing fluorine-containing resin particles and a dispersion medium, and a layer-shaped article-forming coating solution prepared by adding a resin to a fluorine-containing resin particle dispersion.

An example of the solid composition is a composition that contains fluorine-containing resin particles and resin particles (for example, toner particles or powder coating material particles).

Layer-Shaped Article

A layer-shaped article according to an exemplary embodiment includes fluorine-containing resin particles according to an exemplary embodiment. A specific example of the layer-shaped article of the exemplary embodiment is a layer formed of a composition of an exemplary embodiment.

Examples of the layer-shaped article of the exemplary embodiment include an outermost surface layer of an electrophotographic photoreceptor, a toner image, a powder coating layer, and a sliding layer.

The fluorine-containing resin particle content in the layer-shaped article of the exemplary embodiment is preferably 0.1 mass % or more and 40 mass % or less and more preferably 1 mass % or more and 30 mass % or less relative to the layer-shaped article.

Electrophotographic Photoreceptor

An electrophotographic photoreceptor (hereinafter may be referred to as a "photoreceptor") of an exemplary embodiment includes a conductive substrate and a photosensitive layer on the conductive substrate, in which the outermost surface layer of the electrophotographic photoreceptor is formed of the layer-shaped article of the exemplary embodiment.

Examples of the outermost surface layer formed of the layer-shaped article include a charge transporting layer of a multilayer photosensitive layer, a single-layer-type photosensitive layer, and a surface protection layer.

The electrophotographic photoreceptor of the exemplary embodiment will now be described in detail by referring to the drawings.

An electrophotographic photoreceptor 7 illustrated in FIG. 1 includes, for example, a conductive support 4, and an undercoat layer 1, a charge generating layer 2, and a charge transporting layer 3 that are stacked in this order on the conductive support 4. The charge generating layer 2 and the charge transporting layer 3 constitute a photosensitive layer 5.

The electrophotographic photoreceptor 7 may have a layer structure that does not include the undercoat layer 1.

The electrophotographic photoreceptor 7 may include a single-layer-type photosensitive layer in which the functions of the charge generating layer 2 and the charge transporting layer 3 are integrated. In the case of a photosensitive layer having a single-layer-type photosensitive layer, the single-layer-type photosensitive layer constitutes the outermost surface layer.

Alternatively, the electrophotographic photoreceptor 7 may include a surface protection layer on the charge transporting layer 3 or the single-layer-type photosensitive layer. In the case of a photoreceptor having a surface protection layer, the surface protection layer constitutes the outermost surface layer.

In the description below, the respective layers of the electrophotographic photoreceptor of this exemplary embodiment are described in detail. In the description below, the reference signs are omitted.

Conductive Substrate

Examples of the conductive substrate include metal plates, metal drums, and metal belts that contain metals (aluminum, copper, zinc, chromium, nickel, molybdenum, vanadium, indium, gold, platinum, etc.) or alloys (stainless steel etc.). Other examples of the conductive substrate include paper sheets, resin films, and belts coated, vapor-deposited, or laminated with conductive compounds (for example, conductive polymers and indium oxide), metals (for example, aluminum, palladium, and gold), or alloys. Here, "conductive" means having a volume resistivity of less than $10^{13}$ Ωcm.

The surface of the conductive substrate may be roughened to a center-line average roughness Ra of 0.04 µm or more and 0.5 µm or less in order to suppress interference fringes that occur when the electrophotographic photoreceptor used in a laser printer is irradiated with a laser beam. When incoherent light is used as a light source, there is no need to roughen the surface to prevent interference fringes, but roughening the surface suppresses generation of defects due to irregularities on the surface of the conductive substrate and thus is desirable for extending the lifetime.

Examples of the surface roughening method include a wet honing method with which an abrasive suspended in water is sprayed onto a conductive support, a centerless grinding with which a conductive substrate is pressed against a rotating grinding stone to perform continuous grinding, and an anodization treatment.

Another example of the surface roughening method does not involve roughening the surface of a conductive substrate but involves dispersing a conductive or semi-conductive powder in a resin and forming a layer of the resin on a surface of a conductive substrate so as to create a rough surface by the particles dispersed in the layer.

The surface roughening treatment by anodization involves forming an oxide film on the surface of a conductive substrate by anodization by using a metal (for example, aluminum) conductive substrate as the anode in an electrolyte solution. Examples of the electrolyte solution include a sulfuric acid solution and an oxalic acid solution. However, a porous anodization film formed by anodization is chemically active as is, is prone to contamination, and has resistivity that significantly varies depending on the environment. Thus, a pore-sealing treatment may be performed on the porous anodization film so as to seal fine pores in the oxide film by volume expansion caused by hydrating reaction in pressurized steam or boiling water (a metal salt such as a nickel salt may be added) so that the oxide is converted into a more stable hydrous oxide.

The thickness of the anodization film may be, for example, 0.3 µm or more and 15 µm or less. When the thickness is within this range, a barrier property against injection tends to be exhibited, and the increase in residual potential caused by repeated use tends to be suppressed.

The conductive substrate may be subjected to a treatment with an acidic treatment solution or a Boehmite treatment.

The treatment with an acidic treatment solution is, for example, conducted as follows. First, an acidic treatment solution containing phosphoric acid, chromic acid, and hydrofluoric acid is prepared. The blend ratios of phosphoric acid, chromic acid, and hydrofluoric acid in the acidic treatment solution may be, for example, in the range of 10 mass % or more and 11 mass % or less for phosphoric acid, in the range of 3 mass % or more and 5 mass % or less for chromic acid, and in the range of 0.5 mass % or more and 2 mass % or less for hydrofluoric acid; and the total concentration of these acids may be in the range of 13.5 mass % or more and 18 mass % or less. The treatment temperature may be, for example, 42° C. or more and 48° C. or less. The thickness of the film may be 0.3 µm or more and 15 µm or less.

The Boehmite treatment is conducted by immersing a conductive substrate in pure water at 90° C. or higher and 100° C. or lower for 5 to 60 minutes or by bringing a conductive substrate into contact with pressurized steam at 90° C. or higher and 120° C. or lower for 5 to 60 minutes. The thickness of the film may be 0.1 µm or more and 5 µm or less. The Boehmite-treated body may be further anodized by using an electrolyte solution, such as adipic acid, boric acid, a borate salt, a phosphate salt, a phthalate salt, a maleate salt, a benzoate salt, a tartrate salt, or a citrate salt, that has low film-dissolving power.

Undercoat Layer

The undercoat layer is, for example, a layer that contains inorganic particles and a binder resin.

Examples of the inorganic particles include inorganic particles having a powder resistivity (volume resistivity) of $10^2$ Ωcm or more and $10^{11}$ Ωcm or less.

As the inorganic particles having this resistance value, for example, metal oxide particles such as tin oxide particles, titanium oxide particles, zinc oxide particles, or zirconium oxide particles are preferable, and, in particular, zinc oxide particles are preferable.

The specific surface area of the inorganic particles measured by the BET method may be, for example, 10 $m^2/g$ or more.

The volume-average particle diameter of the inorganic particles may be, for example, 50 nm or more and 2000 nm or less (or may be 60 nm or more and 1000 nm or less).

The amount of the inorganic particles contained relative to the binder resin is, for example, preferably 10 mass % or more and 80 mass % or less, and is more preferably 40 mass % or more and 80 mass % or less.

The inorganic particles may be surface-treated. A mixture of two or more inorganic particles subjected to different surface treatments or having different particle diameters may be used.

Examples of the surface treatment agent include a silane coupling agent, a titanate-based coupling agent, an aluminum-based coupling agent, and a surfactant. In particular, a silane coupling agent is preferable, and an amino-group-containing silane coupling agent is more preferable.

Examples of the amino-group-containing silane coupling agent include, but are not limited to, 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane.

Two or more silane coupling agents may be mixed and used. For example, an amino-group-containing silane coupling agent may be used in combination with an additional silane coupling agent. Examples of this additional silane coupling agent include, but are not limited to, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxy silane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

The surface treatment method that uses a surface treatment agent may be any known method, for example, may be a dry method or a wet method.

The treatment amount of the surface treatment agent may be, for example, 0.5 mass % or more and 10 mass % or less relative to the inorganic particles.

Here, the undercoat layer may contain inorganic particles and an electron-accepting compound (acceptor compound) from the viewpoints of long-term stability of electrical properties and carrier blocking properties.

Examples of the electron-accepting compound include electron transporting substances, such as quinone compounds such as chloranil and bromanil; tetracyanoquinodimethane compounds; fluorenone compounds such as 2,4,7-trinitrofluorenone and 2,4,5,7-tetranitro-9-fluorenone; oxadiazole compounds such as 2-(4-biphenyl)-5-(4-t-butylphenyl)-1,3,4-oxadiazole, 2,5-bis (4-naphthyl)-1,3,4-oxadiazole, and 2,5-bis(4-diethylaminophenyl)-1,3,4-oxadiazole; xanthone compounds; thiophene compounds; and diphenoquinone compounds such as 3,3',5,5'-tetra-t-butyldiphenoquinone.

In particular, a compound having an anthraquinone structure may be used as the electron-accepting compound. Examples of the compound having an anthraquinone structure include hydroxyanthraquinone compounds, aminoanthraquinone compounds, and aminohydroxyanthraquinone compounds, and more specific examples thereof include anthraquinone, alizarin, quinizarin, anthrarufin, and purpurin.

The electron-accepting compound may be dispersed in the undercoat layer along with the inorganic particles, or may be attached to the surfaces of the inorganic particles.

Examples of the method for attaching the electron-accepting compound onto the surfaces of the inorganic particles include a dry method and a wet method.

The dry method is, for example, a method with which, while inorganic particles are stirred with a mixer or the like having a large shear force, an electron-accepting compound as is or dissolved in an organic solvent is added dropwise or sprayed along with dry air or nitrogen gas so as to cause the electron-accepting compound to attach to the surfaces of the inorganic particles. When the electron-accepting compound is added dropwise or sprayed, the temperature may be equal to or lower than the boiling point of the solvent. After the electron-accepting compound is added dropwise or sprayed, baking may be further conducted at 100° C. or higher. The temperature and time for baking are not particularly limited as long as the electrophotographic properties are obtained.

The wet method is, for example, a method with which, while inorganic particles are dispersed in a solvent by stirring, ultrasonically, or by using a sand mill, an attritor, or a ball mill, the electron-accepting compound is added, followed by stirring or dispersing, and then the solvent is removed to cause the electron-accepting compound to attach to the surfaces of the inorganic particles. The solvent is removed by, for example, filtration or distillation. After removing the solvent, baking may be further conducted at 100° C. or higher. The temperature and time for baking are not particularly limited as long as the electrophotographic properties are obtained. In the wet method, the moisture contained in the inorganic particles may be removed before adding the electron-accepting compound. For example, the moisture may be removed by stirring and heating the inorganic particles in a solvent or by boiling together with the solvent.

Attaching the electron-accepting compound may be conducted before, after, or simultaneously with the surface treatment of the inorganic particles by a surface treatment agent.

The amount of the electron-accepting compound contained relative to the inorganic particles may be, for example, 0.01 mass % or more and 20 mass % or less, and is preferably 0.01 mass % or more and 10 mass % or less.

Examples of the binder resin used in the undercoat layer include known materials such as known polymer compounds such as acetal resins (for example, polyvinyl butyral), polyvinyl alcohol resins, polyvinyl acetal resins, casein resins, polyamide resins, cellulose resins, gelatin, polyurethane resins, polyester resins, unsaturated polyester resins, methacrylic resins, acrylic resins, polyvinyl chloride resins, polyvinyl acetate resins, vinyl chloride-vinyl acetate-maleic anhydride resins, silicone resins, silicone-alkyd resins, urea resins, phenolic resins, phenol-formaldehyde resins, melamine resins, urethane resins, alkyd resins, and epoxy resins; zirconium chelate compounds; titanium chelate compounds; aluminum chelate compounds; titanium alkoxide compounds; organic titanium compounds; and silane coupling agents.

Other examples of the binder resin used in the undercoat layer include charge transporting resins that have charge transporting groups, and conductive resins (for example, polyaniline).

Among these, a resin that is insoluble in the coating solvent in the overlying layer is suitable as the binder resin used in the undercoat layer. Examples of the particularly suitable resin include thermosetting resins such as a urea resin, a phenolic resin, a phenol-formaldehyde resin, a melamine resin, a urethane resin, an unsaturated polyester resin, an alkyd resin, and an epoxy resin; and a resin obtained by a reaction between a curing agent and at least one resin selected from the group consisting of a polyamide resin, a polyester resin, a polyether resin, a methacrylic resin, an acrylic resin, a polyvinyl alcohol resin, and a polyvinyl acetal resin.

When two or more of these binder resins are used in combination, the mixing ratios are set as necessary.

The undercoat layer may contain various additives to improve electrical properties, environmental stability, and image quality.

Examples of the additives include known materials such as electron transporting pigments based on polycyclic condensed materials and azo materials, zirconium chelate compounds, titanium chelate compounds, aluminum chelate compounds, titanium alkoxide compounds, organic titanium compounds, and silane coupling agents. The silane coupling agent is used to surface-treat the inorganic particles as mentioned above, but may be further added as an additive to the undercoat layer.

Examples of the silane coupling agent used as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compounds include zirconium butoxide, zirconium ethyl acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of the titanium chelate compounds include tetraisopropyl titanate, tetra-n-butyl titanate, butyl titanate dimer, tetra(2-ethylhexyl)titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compounds include aluminum isopropylate, monobutoxyaluminum diisopropylate, aluminum butylate, diethylacetoacetate aluminum diisopropylate, and aluminum tris(ethylacetoacetate).

These additives may be used alone, or two or more compounds may be used as a mixture or a polycondensation product.

The undercoat layer may have a Vickers hardness of 35 or more.

In order to suppress moire images, the surface roughness (ten-point average roughness) of the undercoat layer may be adjusted to be in the range of $1/(4n)$ (n represents the refractive index of the overlying layer) to $½$ of $\lambda$ representing the laser wavelength used for exposure.

In order to adjust the surface roughness, resin particles and the like may be added to the undercoat layer. Examples of the resin particles include silicone resin particles, and crosslinking polymethyl methacrylate resin particles. The surface of the undercoat layer may be polished to adjust the surface roughness. Examples of the polishing method included buff polishing, sand blasting, wet honing, and grinding.

The undercoat layer may be formed by any known method. For example, a coating film is formed by using an undercoat-layer-forming solution prepared by adding the above-mentioned components to a solvent, dried, and, if needed, heated.

Examples of the solvent used for preparing the undercoat-layer-forming solution include known organic solvents, such as alcohol solvents, aromatic hydrocarbon solvents, halogenated hydrocarbon solvents, ketone solvents, ketone alcohol solvents, ether solvents, and ester solvents.

Specific examples of the solvent include common organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method for dispersing inorganic particles in preparing the undercoat-layer-forming solution include known methods that use a roll mill, a ball mill, a vibrating ball mill, an attritor, a sand mill, a colloid mill, and a paint shaker.

Examples of the method for applying the undercoat-layer-forming solution to the conductive substrate include common methods such as a blade coating method, a wire bar coating method, a spray coating method, a dip coating method, a bead coating method, an air knife coating method, and a curtain coating method.

The thickness of the undercoat layer is preferably set within the range of 15 μm or more, and more preferably within the range of 20 μm or more and 50 μm or less.

Intermediate Layer

Although not illustrated in the drawings, an intermediate layer may be further provided between the undercoat layer and the photosensitive layer.

The intermediate layer is, for example, a layer that contains a resin. Examples of the resin used in the intermediate layer include polymer compounds such as acetal resins (for example, polyvinyl butyral), polyvinyl alcohol resins, polyvinyl acetal resins, casein resins, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenol-formaldehyde resins, and melamine resins.

The intermediate layer may contain an organic metal compound. Examples of the organic metal compound used in the intermediate layer include organic metal compounds containing metal atoms such as zirconium, titanium, aluminum, manganese, and silicon.

These compounds used in the intermediate layer may be used alone, or two or more compounds may be used as a mixture or a polycondensation product.

In particular, the intermediate layer may be a layer that contains an organic metal compound that contains zirconium atoms or silicon atoms.

The intermediate layer may be formed by any known method. For example, a coating film is formed by using an intermediate-layer-forming solution prepared by adding the above-mentioned components to a solvent, dried, and, if needed, heated.

Examples of the application method for forming the intermediate layer include common methods such as a dip coating method, a lift coating method, a wire bar coating method, a spray coating method, a blade coating method, a knife coating method, and a curtain coating method.

The thickness of the intermediate layer may be set within the range of, for example, 0.1 μm or more and 3 μm or less. The intermediate layer may be used as the undercoat layer.

Charge Generating Layer

The charge generating layer is, for example, a layer that contains a charge generating material and a binder resin. The charge generating layer may be a vapor deposited layer of a charge generating material. The vapor deposited layer of the charge generating material may be used when an incoherent light such as a light emitting diode (LED) or an organic electro-luminescence (EL) image array is used.

Examples of the charge generating material include azo pigments such as bisazo and trisazo pigments; fused-ring aromatic pigments such as dibromoanthanthrone; perylene pigments; pyrrolopyrrole pigments; phthalocyanine pigments; zinc oxide; and trigonal selenium.

Among these, in order to be compatible to the near-infrared laser exposure, a metal phthalocyanine pigment or a metal-free phthalocyanine pigment may be used as the charge generating material. Specific examples thereof include hydroxygallium phthalocyanine, chlorogallium phthalocyanine, dichlorotin phthalocyanine, and titanyl phthalocyanine.

In order to be compatible to the near ultraviolet laser exposure, the charge generating material may be a fused-ring aromatic pigment such as dibromoanthanthrone, a thio-indigo pigment, a porphyrazine compound, zinc oxide, trigonal selenium, a bisazo pigment.

When an incoherent light source, such as an LED or an organic EL image array having an emission center wavelength in the range of 450 nm or more and 780 nm or less, is used, the charge generating material described above may be used; however, from the viewpoint of the resolution, when the photosensitive layer is as thin as 20 μm or less, the electric field intensity in the photosensitive layer is increased, charges injected from the substrate are decreased, and image defects known as black spots tend to occur. This is particularly noticeable when a charge generating material, such as trigonal selenium or a phthalocyanine pigment, that is of a p-conductivity type and easily generates dark current is used.

In contrast, when an n-type semiconductor, such as a fused-ring aromatic pigment, a perylene pigment, or an azo pigment, is used as the charge generating material, dark current rarely occurs and, even when the thickness is small, image defects known as black spots can be suppressed.

Whether n-type or not is determined by a time-of-flight method commonly employed, on the basis of the polarity of the photocurrent flowing therein. A material in which electrons flow more smoothly as carriers than holes is determined to be of an n-type.

The binder resin used in the charge generating layer is selected from a wide range of insulating resins. Alternatively, the binder resin may be selected from organic photoconductive polymers, such as poly-N-vinylcarbazole, polyvinyl anthracene, polyvinyl pyrene, and polysilane.

Examples of the binder resin include, polyvinyl butyral resins, polyarylate resins (polycondensates of bisphenols and aromatic dicarboxylic acids etc.), polycarbonate resins, polyester resins, phenoxy resins, vinyl chloride-vinyl acetate copolymers, polyamide resins, acrylic resins, polyacrylamide resins, polyvinyl pyridine resins, cellulose resins, urethane resins, epoxy resins, casein, polyvinyl alcohol resins, and polyvinyl pyrrolidone resins. Here, "insulating" means having a volume resistivity of $10^{13}$ Ωcm or more.

These binder resins are used alone or in combination as a mixture.

The blend ratio of the charge generating material to the binder resin may be in the range of 10:1 to 1:10 on a mass ratio basis.

The charge generating layer may contain other known additives.

The charge generating layer may be formed by any known method. For example, a coating film is formed by using an charge-generating-layer-forming solution prepared by adding the above-mentioned components to a solvent, dried, and, if needed, heated. The charge generating layer may be formed by vapor-depositing a charge generating material. The charge generating layer may be formed by vapor deposition particularly when a fused-ring aromatic pigment or a perylene pigment is used as the charge generating material.

Specific examples of the solvent for preparing the charge-generating-layer-forming solution include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in combination as a mixture.

The method for dispersing particles (for example, the charge generating material) in the charge-generating-layer-forming solution can use a media disperser such as a ball mill, a vibrating ball mill, an attritor, a sand mill, or a horizontal sand mill, or a media-less disperser such as stirrer, an ultrasonic disperser, a roll mill, or a high-pressure homogenizer. Examples of the high-pressure homogenizer include a collision-type homogenizer in which the dispersion in a high-pressure state is dispersed through liquid-liquid collision or liquid-wall collision, and a penetration-type homogenizer in which the fluid in a high-pressure state is caused to penetrate through fine channels.

In dispersing, it is effective to set the average particle diameter of the charge generating material in the charge-generating-layer-forming solution to 0.5 μm or less, preferably 0.3 μm or less, and more preferably 0.15 μm or less.

Examples of the method for applying the charge-generating-layer-forming solution to the undercoat layer (or the intermediate layer) include common methods such as a blade coating method, a wire bar coating method, a spray coating method, a dip coating method, a bead coating method, an air knife coating method, and a curtain coating method.

The thickness of the charge generating layer is preferably set within the range of, for example, 0.1 μm or more and 5.0 μm or less, and more preferably within the range of 0.2 μm or more and 2.0 μm or less.

Charge Transporting Layer

The charge transporting layer is, for example, a layer that contains a charge transporting material and a binder resin. The charge transporting layer may be a layer that contains a polymer charge transporting material.

Examples of the charge transporting material include electron transporting compounds such as quinone compounds such as p-benzoquinone, chloranil, bromanil, and anthraquinone; tetracyanoquinodimethane compounds; fluorenone compounds such as 2,4,7-trinitrofluorenone; xanthone compounds; benzophenone compounds; cyanovinyl compounds; and ethylene compounds. Other examples of the charge transporting material include hole transporting compounds such as triarylamine compounds, benzidine compounds, aryl alkane compounds, aryl-substituted ethylene compounds, stilbene compounds, anthracene compounds, and hydrazone compounds. These charge transporting materials may be used alone or in combination, but are not limiting.

From the viewpoint of charge mobility, the charge transporting material may be a triaryl amine derivative represented by structural formula (a-1) below or a benzidine derivative represented by structural formula (a-2) below.

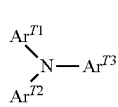

(a-1)

In structural formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent for each of the groups described above include a halogen atom, an alkyl group having 1 to 5 carbon atoms, and an alkoxy group having 1 to 5 carbon atoms. Examples of the substituent for each of the groups described above include a substituted amino group substituted with an alkyl group having 1 to 3 carbon atoms.

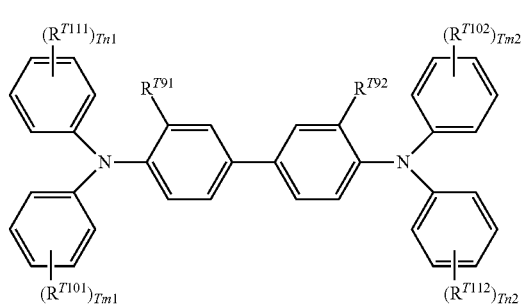

(a-2)

In structural formula (a-2), $R^{T91}$ and $R^{T92}$ each independently represent a hydrogen atom, a halogen atom, an alkyl group having 1 to 5 carbon atoms, or an alkoxy group having 1 to 5 carbon atoms. $R^{T101}$, $R^{T102}$, $R^{T111}$, and $R^{T112}$ each independently represent a halogen atom, an alkyl group having 1 to 5 carbon atoms, an alkoxy group having 1 to 5 carbon atoms, an amino group substituted with an alkyl group having 1 or 2 carbon atoms, a substituted or unsubstituted aryl group, $-C(R^{T12})=C(R^{T13})(R^{T14})$, or $-CH=CH-CH=C(R^{T15})(R^{T16})$; and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of the substituent for each of the groups described above include a halogen atom, an alkyl group having 1 to 5 carbon atoms, and an alkoxy group having 1 to 5 carbon atoms. Examples of the substituent for each of the groups described above include a substituted amino group substituted with an alkyl group having 1 to 3 carbon atoms.

Here, among the triarylamine derivatives represented by structural formula (a-1) and the benzidine derivatives represented by structural formula (a-2) above, a triarylamine derivative having $-C_6H_4-CH=CH-CH=C(R^{T7})(R^{T8})$ or a benzidine derivative having $-CH=CH-CH=C(R^{T15})(R^{T16})$ may be used from the viewpoint of the charge mobility.

Examples of the polymer charge transporting material that can be used include known charge transporting materials such as poly-N-vinylcarbazole and polysilane. In particular, polyester polymer charge transporting materials may be used. The polymer charge transporting material may be used alone or in combination with a binder resin.

Among these charge transporting materials, a charge transporting material having a butadiene structure and a triarylamine structure (hereinafter this material may be referred to as a "butadiene-based charge transporting material") from the viewpoint of suppressing density nonuniformity of a granular image.

One example of the butadiene-based charge transporting material is a compound in which an organic group having a diphenylmethane structure ($=C(Ph)_2$, where Ph=benzene ring) is bonded to at least one of the three benzene rings of the triarylamine structure via an aliphatic group having a butadiene structure.

Specific examples of the butadiene-based charge transporting material include charge transport materials represented by general formula (CT1) below.

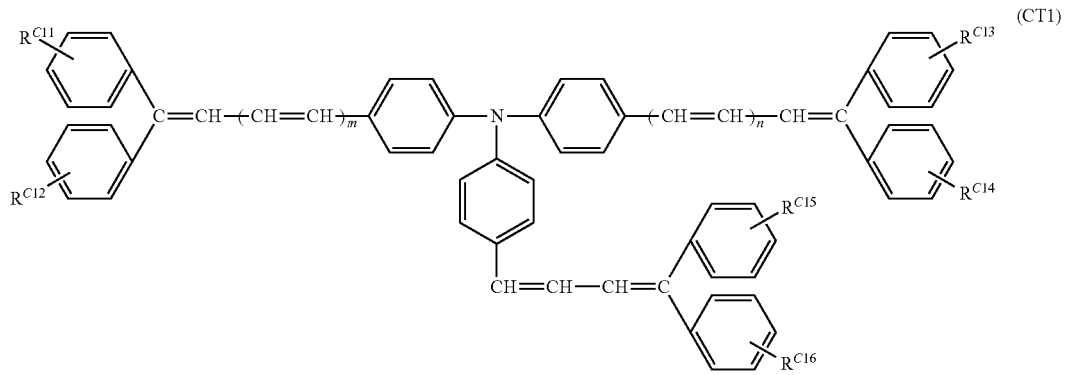

(CT1)

In general formula (CT1), $R^{C11}$, $R^{C12}$, $R^{C13}$, $R^{C14}$, $R^{C15}$, and $R^{C16}$ each independently represent a hydrogen atom, a halogen atom, an alkyl group having 1 to 20 carbon atoms, an alkoxy group having 1 to 20 carbon atoms, or an aryl group having 6 to 30 carbon atoms, and any two adjacent substituents may be bonded to each other to form a hydrocarbon ring structure.

Here, n and m each independently represent 0, 1, or 2.

In general formula (CT1), examples of the halogen atoms represented by $R^{C11}$, $R^{C12}$, $R^{C13}$, $R^{C14}$, $R^{C15}$, and $R^{C16}$ include a fluorine atom, a chlorine atom, a bromine atom, and an iodine atom. Among these, a fluorine atom or a chlorine atom is preferable, and a chlorine atom is more preferable as the halogen atom.

Examples of the alkyl groups represented by $R^{C11}$, $R^{C12}$, $R^{C13}$, $R^{C14}$, $R^{C15}$, and $R^{C16}$ in general formula (CT1) include linear or branched alkyl groups having 1 to 20 carbon atoms (preferably 1 to 6 carbon atoms and more preferably 1 to 4 carbon atoms).

Specific examples of the linear alkyl group include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group.

Specific examples of the branched alkyl groups include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isoundecyl group, a sec-undecyl group, a tert-undecyl group, a neoundecyl group, an isododecyl group, a sec-dodecyl group, a tert-dodecyl group, a neododecyl group, an isotridecyl group, a sec-tridecyl group, a tert-tridecyl group, a neotridecyl group, an isotetradecyl group, a sec-tetradecyl group, a tert-tetradecyl group, a neotetradecyl group, a 1-isobutyl-4-ethyloctyl group, an isopentadecyl group, a sec-pentadecyl group, a tert-pentadecyl group, a neopentadecyl group, an isohexadecyl group, a sec-hexadecyl group, a tert-hexadecyl group, a neohexadecyl group, a 1-methylpentadecyl group, an isoheptadecyl group, a sec-heptadecyl group, a tert-heptadecyl group, a neoheptadecyl group, an isooctadecyl group, a sec-octadecyl group, a tert-octadecyl group, a neooctadecyl group, an isononadecyl group, a sec-nonadecyl group, a tert-nonadecyl group, a neononadecyl group, a 1-methyloctyl group, an isoicosyl group, a sec-icosyl group, a tert-icosyl group, and a neoicosyl group.

Among these, lower alkyl groups such as a methyl group, an ethyl group, and isopropyl group are preferable as the alkyl group.

Examples of the alkoxy groups represented by $R^{C11}$, $R^{C12}$, $R^{C13}$, $R^{C14}$, $R^{C15}$, and $R^{C16}$ in general formula (CT1) include linear or branched alkoxy groups having 1 to 20 carbon atoms (preferably 1 to 6 carbon atoms and more preferably 1 to 4 carbon atoms).

Specific examples of the linear alkoxy group include a methoxy group, an ethoxy group, an n-propoxy group, an n-butoxy group, an n-pentyloxy group, an n-hexyloxy group, an n-heptyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group, and an n-icosyloxy group.

Specific examples of the branched alkoxy group include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, a tert-hexyloxy group, an isoheptyloxygroup, a sec-heptyloxy group, a tert-heptyloxy group, an isooctyloxy group, a sec-octyloxy group, a tert-octyloxy group, an isononyloxy group, a sec-nonyloxy group, a tert-nonyloxy group, an isodecyloxy group, a sec-decyloxy group, a tert-decyloxy group, an isoundecyloxy group, a sec-undecyloxy group, a tert-undecyloxy group, a neoundecyloxy group, an isododecyloxy group, a sec-dodecyloxy group, a tert-dodecyloxy group, a neododecyloxy group, an isotridecyloxy group, a sec-tridecyloxy group, a tert-tridecyloxy group, a neotridecyloxy group, an isotetradecyloxy group, a sec-tetradecyloxy group, a tert-tetradecyloxy group, a neotetradecyloxy group, a 1-isobutyl-4-ethyloctyloxy group, an isopentadecyloxy group, a sec-pentadecyloxy group, a tert-pentadecyloxy group, a neopentadecyloxy group, an isohexadecyloxy group, a sec-hexadecyloxy group, a tert-hexadecyloxy group, a neohexadecyloxy group, a 1-methylpentadecyloxy group, an isoheptadecyloxy group, a sec-heptadecyloxy group, a tert-peptadecyloxy group, a neoheptadecyloxy group, an isooctadecyloxy group, a sec-octadecyloxy group, a tert-octadecyloxy group, a neooctadecyloxy group, an isononadecyloxy group, a sec-nonadecyloxy group, a tert-nonadecyloxy group, a neononadecyloxy group, a 1-methyloctyloxy group, an isoicosyloxy group, a sec-icosyloxy group, a tert-icosyloxy group, and a neoicosyloxy group.

Among these, a methoxy group may be used as the alkoxy group.

Examples of the aryl groups represented by $R^{C11}$, $R^{C12}$, $R^{C13}$, $R^{C14}$, $R^{C15}$, and $R^{C16}$ in general formula (CT1) include aryl groups having 6 to 30 carbon atoms (preferably 6 to 20 carbon atoms and more preferably 6 to 16 carbon atoms).

Specific examples of the aryl group include a phenyl group, a naphthyl group, a phenanthryl group, a biphenylyl group.

Among these, a phenyl group or a naphthyl group may be used as the aryl group.

In general formula (CT1), the respective substituents represented by $R^{C11}$, $R^{C12}$, $R^{C13}$, $R^{C14}$, $R^{C15}$, and $R^{C16}$ may further have substituents. Examples of the substituents include atoms and groups (for example, a halogen atom, an alkyl group, an alkoxy group, and an aryl group), examples of which are described above.

In general formula (CT1), adjacent two selected from $R^{C11}$, $R^{C12}$, $R^{C13}$, $R^{C14}$, $R^{C15}$, and $R^{C16}$ may be linked with each other to form a hydrocarbon ring structure (for example, $R^{C11}$ and $R^{C12}$ may be linked to each other, so may $R^{C13}$ and $R^{C14}$, and so may $R^{C15}$ and $R^{C16}$). Examples of the group that links these substituents to each other in the hydrocarbon ring structure include a single bond, a 2,2'-methylene group, a 2,2'-ethylene group, and a 2,2'-vinylene group. Among these a single bond and a 2,2'-methylene group are preferable.

Specific examples of the hydrocarbon ring structure include a cycloalkane structure, a cycloalkene structure, and a cycloalkanepolyene structure.

In general formula (CT1), n and m may each represent 1.

In general formula (CT1), from the viewpoint of forming a photosensitive layer (charge transporting layer) having high charge transporting performance, $R^{C11}$, $R^{C12}$, $R^{C13}$, $R^{C14}$, $R^{C15}$, and $R^{C16}$ may each independently represent a hydrogen atom, an alkyl group having 1 to 20 carbon atoms, or an alkoxy group having 1 to 20 carbon atoms, and m and n may each represent 1 or 2. More preferably, $R^{C11}$, $R^{C12}$, $R^{C13}$, $R^{C14}$, $R^{C15}$, and $R^{C16}$ each represent a hydrogen atom, and m and n each represent 1.

In other words, the butadiene-based charge transporting material (CT1) is more preferably a charge transporting material represented by structural formula (CT1A) (example compound (CT1-3)) below.

The butadiene-based charge transporting materials (CT1) may be used alone or in combination.

Examples of the binder resin used in the charge transporting layer include polycarbonate resins, polyester resins, polyarylate resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone alkyd resins, phenol-formaldehyde resins, styrene-alkyd resins, poly-N-vinylcarbazole, and polysilane. Among these, a polycarbonate resin or a polyarylate resin may be used as the binder resin. These binder resins are used alone or in combination.

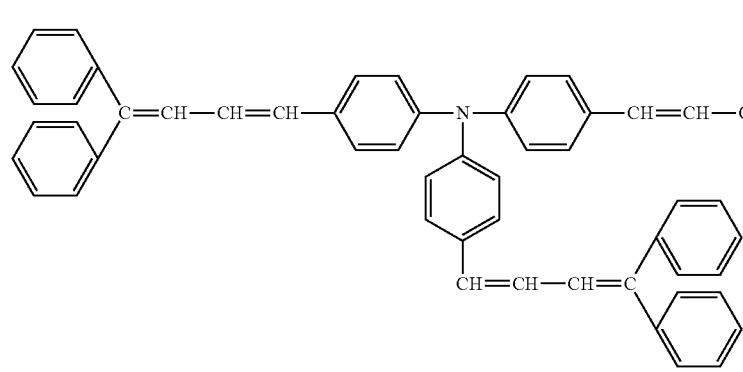
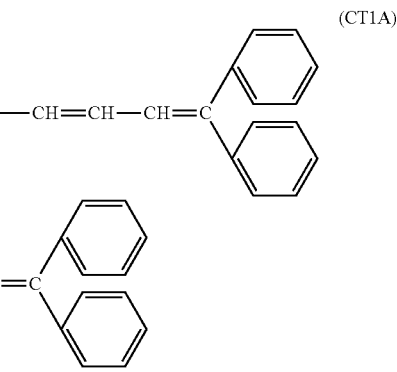

(CT1A)

Specific non-limiting examples of the butadiene-based charge transporting material (CT1) are as follows.

| Example compound No. | m | n | $R^{C11}$ | $R^{C12}$ | $R^{C13}$ | $R^{C14}$ | $R^{C15}$ | $R^{C16}$ |
|---|---|---|---|---|---|---|---|---|
| CT1-1 | 1 | 1 | 4-CH₃ | 4-CH₃ | 4-CH₃ | 4-CH₃ | H | H |
| CT1-2 | 2 | 2 | H | H | H | H | 4-CH₃ | 4-CH₃ |
| CT1-3 | 1 | 1 | H | H | H | H | H | H |
| CT1-4 | 2 | 2 | H | H | H | H | H | H |
| CT1-5 | 1 | 1 | 4-CH₃ | 4-CH₃ | 4-CH₃ | H | H | H |
| CT1-6 | 0 | 1 | H | H | H | H | H | H |
| CT1-7 | 0 | 1 | 4-CH₃ | 4-CH₃ | 4-CH₃ | 4-CH₃ | 4-CH₃ | 4-CH₃ |
| CT1-8 | 0 | 1 | 4-CH₃ | 4-CH₃ | H | H | 4-CH₃ | 4-CH₃ |
| CT1-9 | 0 | 1 | H | H | 4-CH₃ | 4-CH₃ | H | H |
| CT1-10 | 0 | 1 | H | H | 3-CH₃ | 3-CH₃ | H | H |
| CT1-11 | 0 | 1 | 4-CH₃ | H | H | H | 4-CH₃ | H |
| CT1-12 | 0 | 1 | 4-OCH₃ | H | H | H | 4-OCH₃ | H |
| CT1-13 | 0 | 1 | H | H | 4-OCH₃ | 4-OCH₃ | H | H |
| CT1-14 | 0 | 1 | 4-OCH₃ | H | 4-OCH₃ | H | 4-OCH₃ | 4-OCH₃ |
| CT1-15 | 0 | 1 | 3-CH₃ | H | 3-CH₃ | H | 3-CH₃ | H |
| CT1-16 | 1 | 1 | 4-CH₃ | 4-CH₃ | 4-CH₃ | 4-CH₃ | 4-CH₃ | 4-CH₃ |
| CT1-17 | 1 | 1 | 4-CH₃ | 4-CH₃ | H | H | 4-CH₃ | 4-CH₃ |
| CT1-18 | 1 | 1 | H | H | 4-CH₃ | 4-CH₃ | H | H |
| CT1-19 | 1 | 1 | H | H | 3-CH₃ | 3-CH₃ | H | H |
| CT1-20 | 1 | 1 | 4-CH₃ | H | H | H | 4-CH₃ | H |
| CT1-21 | 1 | 1 | 4-OCH₃ | H | H | H | 4-OCH₃ | H |
| CT1-22 | 1 | 1 | H | H | 4-OCH₃ | 4-OCH₃ | H | H |
| CT1-23 | 1 | 1 | 4-OCH₃ | H | 4-OCH₃ | H | 4-OCH₃ | 4-OCH₃ |
| CT1-24 | 1 | 1 | 3-CH₃ | H | 3-CH₃ | H | 3-CH₃ | H |

In the aforementioned example compounds, abbreviations are as follows. Moreover, the number preceding a substituent indicates the substitution position relative to the benzene ring.

—CH₃: methyl group

—OCH₃: methoxy group

A polycarbonate resin may be used as a binder resin from the viewpoints of durability and high image quality. Meanwhile, when fluorine-containing resin particles containing a large number of carboxyl groups are used together with a polycarbonate resin, the dispersibility of the fluorine-containing resin particles tends to be degraded. Degradation of the fluorine-containing resin particle dispersibility roughens the surface of the outermost surface layer, and density nonuniformity readily occurs in a granular image.

The reason behind this phenomenon is presumably as follows. The carbonate groups (—OC(=O)O—) in the polycarbonate resin and the carboxyl groups in the fluorine-containing resin particles interact with each other and clog the sites of the fluorine-containing resin particles to which the fluorine-containing dispersant adsorbs. Thus, steric hindrance caused by the polycarbonate resin renders it difficult for the fluorine-containing dispersant to adsorb onto the surfaces of the fluorine-containing resin particles. As a result, the fluorine-containing resin particles are deteriorated, and image defects caused by spreading of the dot area readily occur.

In particular, the number of carbonate groups (—OC(=O)O—) per unit mol increases by using a polycarbonate resin having a structural unit represented by general formula (PCA) below and a structural unit represented by general formula (PCB) below, and thus the dispersibility of the fluorine-containing resin particles is degraded. There is a higher tendency that the image defects would occur due to spreading of the dot area.

Thus, when a polycarbonate resin that has a structural unit represented by general formula (PCA) and a structural unit represented by general formula (PCB) below is to be used, the density nonuniformity of a granular image is suppressed by using fluorine-containing resin particles having 0 or more and 30 or less carboxyl groups per $10^6$ carbon atoms.

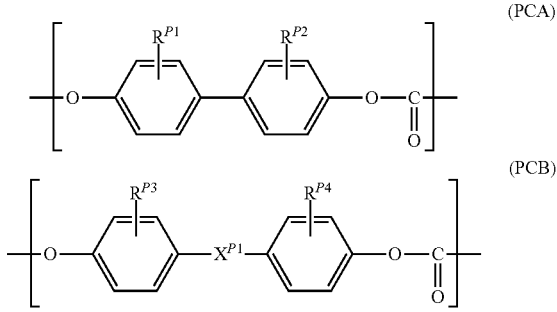

In general formulae (PCA) and (PCB), $R^{P1}$, $R^{P2}$, $R^{P3}$, and $R^{P4}$ each independently represent a hydrogen atom, a halogen atom, an alkyl group having 1 to 6 carbon atoms, a cycloalkyl group having 5 to 7 carbon atoms, or an aryl group having 6 to 12 carbon atoms. $X^{P1}$ represents a phenylene group, a biphenylene group, a naphthylene group, an alkylene group, or a cycloalkylene group.

Examples of the alkyl groups represented by $R^{P1}$, $R^{P2}$, $R^{P3}$, and $R^{P4}$ in general formulae (PCA) and (PCB) include linear or branched alkyl groups having 1 to 6 carbon atoms (preferably 1 to 3 carbon atoms).

Specific examples of the linear alkyl group include a methyl group, an ethyl group, an n-propyl group, an n-butyl group, an n-pentyl group, and an n-hexyl group.

Specific examples of the branched alkyl group include an isopropyl group, an isobutyl group, a sec-butyl group, a tert-butyl group, an isopentyl group, a neopentyl group, a tert-pentyl group, an isohexyl group, a sec-hexyl group, and a tert-hexyl group.

Among these, lower alkyl groups such as a methyl group and an ethyl group are preferable as the alkyl group.

Examples of the cycloalkyl groups represented by $R^{P1}$, $R^{P2}$, $R^{P3}$, and $R^{P4}$ in general formulae (PCA) and (PCB) include cyclopentyl, cyclohexyl, and cycloheptyl.

Examples of the aryl groups represented by $R^{P1}$, $R^{P2}$, $R^{P3}$, and $R^{P4}$ in general formulae (PCA) and (PCB) include a phenyl group, a naphthyl group, and a biphenylyl group.

Examples of the alkylene group represented by $X^{P1}$ in general formula (PCB) include linear or branched alkylene groups having 1 to 12 carbon atoms (preferably 1 to 6 carbon atoms and more preferably 1 to 3 carbon atoms).

Specific examples of the linear alkylene group include a methylene group, an ethylene group, an n-propylene group, an n-butylene group, an n-pentylene group, an n-hexylene group, an n-heptylene group, an n-octylene group, an n-nonylene group, an n-decylene group, an n-undecylene group, and an n-dodecylene group.

Examples of the branched alkylene group include an isopropylene group, an isobutylene group, a sec-butylene group, a tert-butylene group, an isopentylene group, a neopentylene group, a tert-pentylene group, an isohexylene group, a sec-hexylene group, a tert-hexylene group, an isoheptylene group, a sec-heptylene group, a tert-heptylene group, an isooctylene group, a sec-octylene group, a tert-octylene group, an isononylene group, a sec-nonylene group, a tert-nonylene group, an isodecylene group, a sec-decylene group, a tert-decylene group, an isoundecylene group, a sec-undecylene group, a tert-undecylene group, a neoundecylene group, an isododecylene group, a sec-dodecylene group, a tert-dodecylene group, and a neododecylene group.

Among these, lower alkyl groups such as a methylene group, an ethylene group, and a butylene group are preferable as the alkylene group.

Examples of the cycloalkylene group represented by $X^{P1}$ in general formula (PCB) include cycloalkylene groups having 3 to 12 carbon atoms (preferably 3 to 10 carbon atoms and more preferably 5 to 8 carbon atoms).

Specific examples of the cycloalkylene group include a cyclopropylene group, a cyclopentylene group, a cyclohexylene group, a cyclooctylene group, and a cyclododecanylene group.

Among these, a cyclohexylene group may be used as the cycloalkylene group.

In general formulae (PCA) and (PCB), the respective substituents represented by $R^{P1}$, $R^{P2}$, $R^{P3}$, $R^{P4}$, and $X^{P1}$ may further have substituents. Examples of the substituents include halogen atoms (for example, a fluorine atom and a chlorine atom), alkyl groups (for example, alkyl groups having 1 to 6 carbon atoms), cycloalkyl groups (for example, cycloalkyl groups having 5 to 7 carbon atoms), alkoxy groups (for example, alkoxy groups having 1 to 4 carbon atoms), and aryl groups (for example, a phenyl group, a naphthyl group, and a biphenylyl group).

In general formula (PCA), $R^{P1}$ and $R^{P2}$ preferably each independently represent a hydrogen atom or an alkyl group having 1 to 6 carbon atoms, and more preferably each independently represent a hydrogen atom.

In general formula (PCB), $R^{P3}$ and $R^{P4}$ may each independently represent a hydrogen atom or an alkyl group having 1 to 6 carbon atoms, and $X^{P1}$ may represent an alkylene group or a cycloalkylene group.

Specific non-limiting examples of the BP polycarbonate resin are as follows. In the example compounds, pm and pn represent copolymerization ratios.

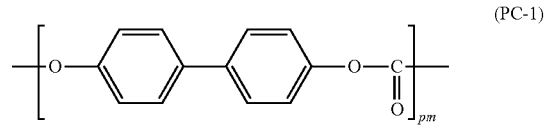

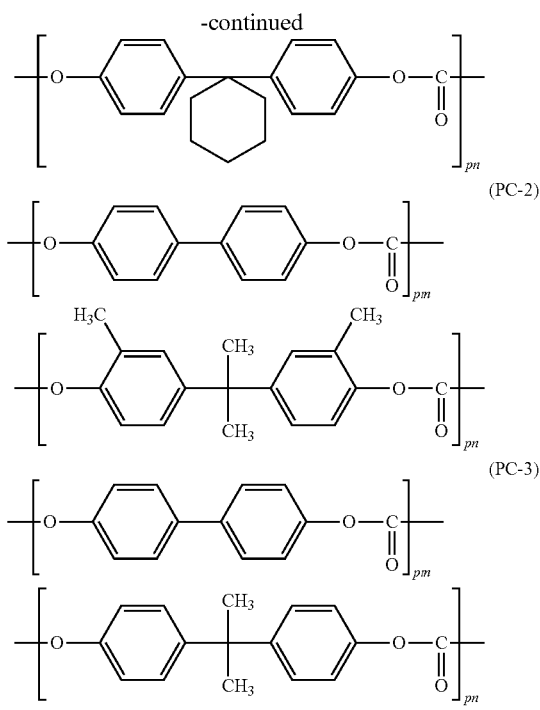

(PC-2)
(PC-3)

In the P polycarbonate resin, the content ratio (copolymerization ratio) of the structural unit represented by general formula (PCA) may be in the range of 5 mol % or more and 95 mol % or less relative to all structural units constituting the polycarbonate resin, and is more preferably in the range of 5 mol % or more and 50 mol % or less and yet more preferably in the range of 15 mol % or more and 30 mol % or less from the viewpoint of suppressing the density non-uniformity of the granular image.

Specifically, in the example compounds of the BP polycarbonate resin described above, pm and pn representing the copolymerization ratios (molar ratios) may be in the range of pm:pn=95:5 to 5:95, preferably in the range of 50:50 to 5:95, and yet more preferably in the range of 15:85 to 30:70.

The blend ratio of the charge transporting material to the binder resin may be in the range of 10:1 to 1:5 on a mass ratio basis.

The charge transporting layer may contain other known additives.

The charge transporting layer may be formed by any known method. For example, a coating film is formed by using a charge-transporting-layer-forming solution prepared by adding the above-mentioned components to a solvent, dried, and, if needed, heated.

Examples of the solvent used to prepare the charge-transporting-layer-forming solution include common organic solvents such as aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in combination as a mixture.

Examples of the method for applying the charge-transporting-layer-forming solution to the charge generating layer include common methods such as a blade coating method, a wire bar coating method, a spray coating method, a dip coating method, a bead coating method, an air knife coating method, and a curtain coating method.

The thickness of the charge transporting layer is preferably set within the range of, for example, 5 μm or more and 50 μm or less, and more preferably within the range of 10 μm or more and 30 μm or less.

Protective Layer

A protective layer is disposed on a photosensitive layer if necessary. The protective layer is, for example, formed to avoid chemical changes in the photosensitive layer during charging and further improve the mechanical strength of the photosensitive layer.

Thus, the protective layer may be a layer formed of a cured film (crosslinked film). Examples of such a layer include layers indicated in 1) and 2) below.

1) A layer formed of a cured film of a composition that contains a reactive-group-containing charge transporting material having a reactive group and a charge transporting skeleton in the same molecule (in other words, a layer that contains a polymer or crosslinked body of the reactive-group-containing charge transporting material).

2) A layer formed of a cured film of a composition that contains a non-reactive charge transporting material, and a reactive-group-containing non-charge transporting material that does not have a charge transporting skeleton but has a reactive group (in other words, a layer that contains a polymer or crosslinked body of the non-reactive charge transporting material and the reactive-group-containing non-charge transporting material).

Examples of the reactive group contained in the reactive-group-containing charge transporting material include chain-polymerizable groups, an epoxy group, —OH, —OR (where R represents an alkyl group), —NH$_2$, —SH, —COOH, and —SiR$^{Q1}_{3-Qn}$(OR$^{Q2}$)$_{Qn}$ (where R$^{Q1}$ represents a hydrogen atom, an alkyl group, or a substituted or unsubstituted aryl group, R$^{Q2}$ represents a hydrogen atom, an alkyl group, or a trialkylsilyl group, and Qn represents an integer of 1 to 3).

The chain-polymerizable group may be any radical-polymerizable functional group, and an example thereof is a functional group having a group that contains at least a carbon-carbon double bond. A specific example thereof is a group that contains at least one selected from a vinyl group, a vinyl ether group, a vinyl thioether group, a styryl group (vinylphenyl group), an acryloyl group, a methacryloyl group, and derivatives thereof. Among these, the chain-polymerizable group may be a group that contains at least one selected from a vinyl group, a vinylphenyl group, an acryloyl group, a methacryloyl group, and derivatives thereof due to their excellent reactivity.

The charge transporting skeleton of the reactive-group-containing charge transporting material may be any known structure used in the electrophotographic photoreceptor, and examples thereof include skeletons that are derived from nitrogen-containing hole transporting compounds, such as triarylamine compounds, benzidine compounds, and hydrazone compounds, and that are conjugated with nitrogen atoms. Among these, a triarylamine skeleton is preferable.

The reactive-group-containing charge transporting material that has such a reactive group and a charge transporting skeleton, the non-reactive charge transporting material, and the reactive-group-containing non-charge transporting material may be selected from among known materials.

The protective layer may contain other known additives.

The protective layer may be formed by any known method. For example, a coating film is formed by using a protective-layer-forming solution prepared by adding the above-mentioned components to a solvent, dried, and, if needed, cured such as by heating.

Examples of the solvent used to prepare the protective-layer-forming solution include aromatic solvents such as toluene and xylene, ketone solvents such as methyl ethyl ketone, methyl isobutyl ketone, and cyclohexanone, ester solvents such as ethyl acetate and butyl acetate, ether solvents such as tetrahydrofuran and dioxane, cellosolve solvents such as ethylene glycol monomethyl ether, and alcohol solvents such as isopropyl alcohol and butanol. These solvents are used alone or in combination as a mixture.

The protective-layer-forming solution may be a solvent-free solution.

Examples of the application method used to apply the protective-layer-forming solution onto the photosensitive layer (for example, the charge transporting layer) include common methods such as a dip coating method, a lift coating method, a wire bar coating method, a spray coating method, a blade coating method, a knife coating method, and a curtain coating method.

The thickness of the protective layer is preferably set within the range of, for example, 1 μm or more and 20 μm or less, and more preferably within the range of 2 μm or more and 10 μm or less.

Single-Layer-Type Photosensitive Layer

The single-layer-type photosensitive layer (charge generating/charge transporting layer) is, for example, a layer that contains a charge generating material, a charge transporting material, and, optionally, a binder resin and other known additives. These materials are the same as those described in relation to the charge generating layer and the charge transporting layer.

The amount of the charge generating material contained in the single-layer-type photosensitive layer relative to the total solid content may be 0.1 mass % or more and 10 mass % or less, and is preferably 0.8 mass % or more and 5 mass % or less. The amount of the charge transporting material contained in the single-layer-type photosensitive layer relative to the total solid content may be 5 mass % or more and 50 mass % or less.

The method for forming the single-layer-type photosensitive layer is the same as the method for forming the charge generating layer and the charge transporting layer.

The thickness of the single-layer-type photosensitive layer may be, for example, 5 μm or more and 50 μm or less, or 10 μm or more and 40 μm or less.

Image Forming Apparatus (and Process Cartridge)

An image forming apparatus of an exemplary embodiment includes an electrophotographic photoreceptor, a charging unit that charges a surface of the electrophotographic photoreceptor, an electrostatic latent image forming unit that forms an electrostatic latent image on the charged surface of the electrophotographic photoreceptor, a developing unit that develops the electrostatic latent image on the surface of the electrophotographic photoreceptor by using a developer that contains a toner so as to form a toner image, and a transfer unit that transfers the toner image onto a surface of a recording medium. The electrophotographic photoreceptor of the exemplary embodiment described above is used as the electrophotographic photoreceptor.

The image forming apparatus of the exemplary embodiment is applied to a known image forming apparatus, examples of which include an apparatus equipped with a fixing unit that fixes the toner image transferred onto the surface of the recording medium; a direct transfer type apparatus with which the toner image formed on the surface of the electrophotographic photoreceptor is directly transferred to the recording medium; an intermediate transfer type apparatus with which the toner image formed on the surface of the electrophotographic photoreceptor is first transferred to a surface of an intermediate transfer body and then the toner image on the surface of the intermediate transfer body is transferred to the surface of the recording medium; an apparatus equipped with a cleaning unit that cleans the surface of the electrophotographic photoreceptor after the toner image transfer and before charging; an apparatus equipped with a charge erasing unit that erases the charges on the surface of the electrophotographic photoreceptor by applying the charge erasing light after the toner image transfer and before charging; and an apparatus equipped with an electrophotographic photoreceptor heating member that elevates the temperature of the electrophotographic photoreceptor to reduce the relative temperature.

In the intermediate transfer type apparatus, the transfer unit includes, for example, an intermediate transfer body having a surface onto which a toner image is to be transferred, a first transfer unit that conducts first transfer of the toner image on the surface of the electrophotographic photoreceptor onto the surface of the intermediate transfer body, and a second transfer unit that conducts second transfer of the toner image on the surface of the intermediate transfer body onto a surface of a recording medium.

The image forming apparatus of this exemplary embodiment may be of a dry development type or a wet development type (development type that uses a liquid developer).

In the image forming apparatus of the exemplary embodiment, for example, a section that includes the electrophotographic photoreceptor may be configured as a cartridge structure (process cartridge) detachably attachable to the image forming apparatus. A process cartridge equipped with the electrophotographic photoreceptor of the exemplary embodiment may be used as this process cartridge. The process cartridge may include, in addition to the electrophotographic photoreceptor, at least one selected from the group consisting of a charging unit, an electrostatic latent image forming unit, a developing unit, and a transfer unit.

Although some examples of the image forming apparatus of an exemplary embodiment are described below, these examples are not limiting. Only relevant sections illustrated in the drawings are described, and descriptions of other sections are omitted.

Figure 2:
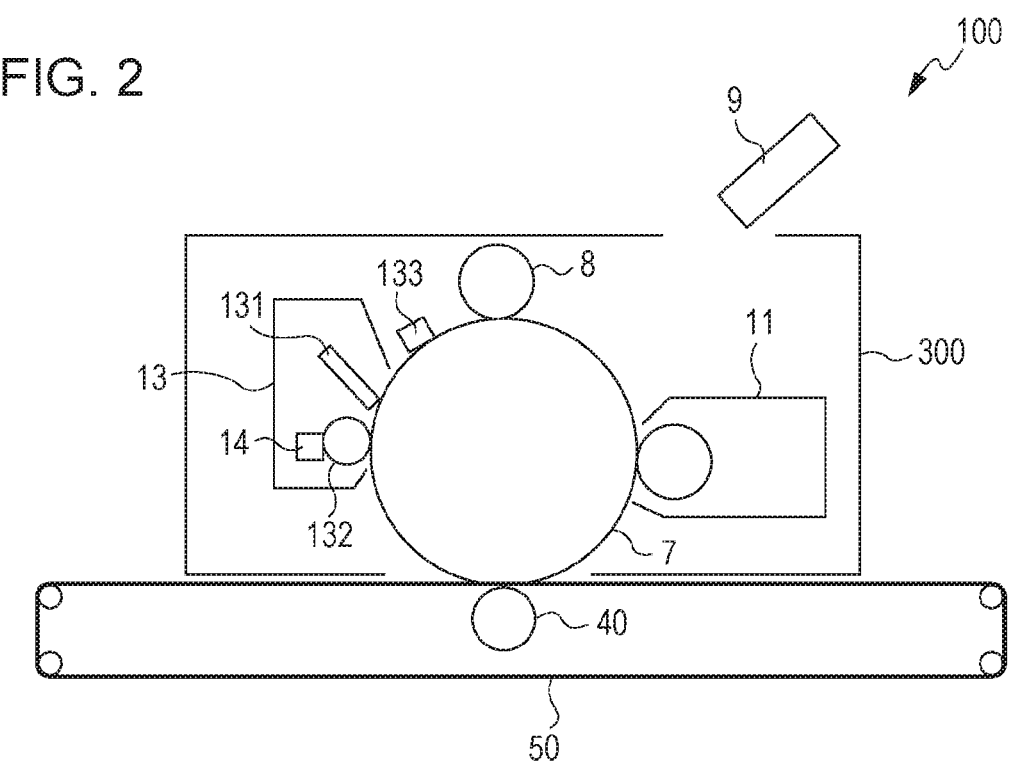
FIG. 2 is a schematic diagram illustrating one example of an image forming apparatus according to an exemplary embodiment.

FIG. 2 is a schematic diagram illustrating one example of an image forming apparatus according to an exemplary embodiment;

As illustrated in FIG. 2, an image forming apparatus 100 of this exemplary embodiment includes a process cartridge 300 equipped with an electrophotographic photoreceptor 7, an exposing device 9 (one example of the electrostatic latent image forming unit), a transfer device 40 (first transfer device), and an intermediate transfer body 50. In this image forming apparatus 100, the exposing device 9 is positioned so that light can be applied to the electrophotographic photoreceptor 7 from the opening of the process cartridge 300, the transfer device 40 is positioned to oppose the electrophotographic photoreceptor 7 with the intermediate transfer body 50 therebetween, and the intermediate transfer body 50 has a portion in contact with the electrophotographic photoreceptor 7. Although not illustrated in the drawings, a second transfer device that transfers the toner image on the intermediate transfer body 50 onto a recording medium (for example, a paper sheet) is also provided. The intermediate transfer body 50, the transfer device 40 (first transfer device), and the second transfer device (not illustrated) correspond to examples of the transfer unit.

The process cartridge 300 illustrated in FIG. 2 integrates and supports the electrophotographic photoreceptor 7, a charging device 8 (one example of the charging unit), a developing device 11 (one example of the developing unit), and a cleaning device 13 (one example of the cleaning unit) in the housing. The cleaning device 13 has a cleaning blade (one example of the cleaning member) 131, and the cleaning blade 131 is in contact with the surface of the electrophotographic photoreceptor 7. The cleaning member may take a form other than the cleaning blade 131, and may be a conductive or insulating fibrous member that can be used alone or in combination with the cleaning blade 131.

Although an example of the image forming apparatus equipped with a fibrous member 132 (roll) that supplies a lubricant 14 to the surface of the electrophotographic photoreceptor 7 and a fibrous member 133 (flat brush) that assists cleaning is illustrated in FIG. 2, these members are optional.

The features of the image forming apparatus of this exemplary embodiment will now be described.

Charging Device

Examples of the charging device 8 include contact-type chargers that use conductive or semi-conducting charging rollers, charging brushes, charging films, charging rubber blades, and charging tubes. Known chargers such as non-contact-type roller chargers, and scorotron chargers and corotron chargers that utilize corona discharge are also used.

Exposing Device

Examples of the exposing device 9 include optical devices that can apply light, such as semiconductor laser light, LED light, or liquid crystal shutter light, into a particular image shape onto the surface of the electrophotographic photoreceptor 7. The wavelength of the light source is to be within the spectral sensitivity range of the electrophotographic photoreceptor. The mainstream wavelength of the semiconductor lasers is near infrared having an oscillation wavelength at about 780 nm. However, the wavelength is not limited to this, and a laser having an oscillation wavelength on the order of 600 nm or a blue laser having an oscillation wavelength of 400 nm or more and 450 nm or less may be used. In order to form a color image, a surface-emitting laser light source that can output multi beams is also effective.

Developing Device

Examples of the developing device 11 include common developing devices that perform development by using a developer in contact or non-contact manner. The developing device 11 is not particularly limited as long as the aforementioned functions are exhibited, and is selected according to the purpose. An example thereof is a known developer that has a function of attaching a one-component developer or a two-component developer to the electrophotographic photoreceptor 7 by using a brush, a roller, or the like. In particular, a development roller that retains the developer on its surface may be used.

The developer used in the developing device 11 may be a one-component developer that contains only a toner or a two-component developer that contains a toner and a carrier. The developer may be magnetic or non-magnetic. Any known developers may be used as these developers.

Cleaning Device

A cleaning blade type device equipped with a cleaning blade 131 is used as the cleaning device 13.

Instead of the cleaning blade type, a fur brush cleaning type device or a development-cleaning simultaneous type device may be employed.

Transfer Device

Examples of the transfer device 40 include contact-type transfer chargers that use belts, rollers, films, rubber blades, etc., and known transfer chargers such as scorotron transfer chargers and corotron transfer chargers that utilize corona discharge.

Intermediate Transfer Body

A belt-shaped member (intermediate transfer belt) that contains semi-conducting polyimide, polyamide imide, polycarbonate, polyarylate, a polyester, a rubber or the like is used as the intermediate transfer body 50. The form of the intermediate transfer body other than the belt may be a drum.

FIG. 3 is a schematic diagram illustrating another example of the image forming apparatus according to the exemplary embodiment.

An image forming apparatus 120 illustrated in FIG. 3 is a tandem-system multicolor image forming apparatus equipped with four process cartridges 300. In the image forming apparatus 120, four process cartridges 300 are arranged in parallel on the intermediate transfer body 50, and one electrophotographic photoreceptor is used for one color. The image forming apparatus 120 is identical to the image forming apparatus 100 except for the tandem system.

Other Usages of Fluorine-Containing Resin Particles

The fluorine-containing resin particles of the exemplary embodiment are suitable for use as an external additive for a toner, an external additive for a powder coating material, an additive for a coating material, an additive for a functional coating material, and an additive for an electrophotographic photoreceptor surface layer.

For example, when the fluorine-containing resin particles are used as an external additive for a toner, examples of the toner include a toner for developing an electrostatic charge image, the toner containing toner particles and, as an external additive, the fluorine-containing resin particles. The toner particles contain a resin (binder resin). The toner particles may further contain a coloring agent, a releasing agent, and other additives if needed.

For example, when the fluorine-containing resin particles are used as an external additive for a powder coating material, an example of the powder coating material is a powder coating material that contains powder particles and, as an external additive, the fluorine-containing resin particles. The powder particles contain a thermosetting resin and a thermal curing agent. The powder particles contain other additives such as a coloring agent if needed.

EXAMPLES

Examples of the present disclosure will now be described in further detail, but the present disclosure is not limited by the examples. Unless otherwise noted, "parts" and "%" are on a mass basis.

Example 1

Preparation of Fluorine-Containing Resin Particles (1)

Fluorine-containing resin particles (1) are produced as follows.

Into a barrier nylon bag, 100 parts by mass of a homopolytetrafluoroethylene fine powder (standard specific gravity measured in accordance with ASTM D 4895 (2004): 2.175) and 2.4 parts by mass of ethanol serving as an additive are taken, and the entire bag is substituted with nitrogen. Subsequently, a cobalt −60γ line is applied at 150 kGy at room temperature to obtain a low-molecular-weight polytetrafluoroethylene powder. The obtained powder is crushed to obtain fluorine-containing resin particles (1).

Example 2

Preparation of Fluorine-Containing Resin Particles (2)

One hundred parts by mass of the fluorine-containing resin particles (1) and 400 parts by mass of methanol are taken, the mixture is washed for 10 minutes in a stirrer at 250 rpm while applying ultrasonic waves, and the supernatant is filtered. This operation is repeated three times, and the filtrate is dried at a reduced pressure at 60° C. for 17 hours to produce fluorine-containing resin particles (2).

Example 3

Preparation of Fluorine-Containing Resin Particles (3)

Fluorine-containing resin particles (3) are produced as with the fluorine-containing resin particles (1) except that the entire bag is substituted with nitrogen so that the oxygen concentration used in producing the fluorine-containing resin particles (1) is changed to 10%.

Example 4

Preparation of Fluorine-Containing Resin Particles (4)

Fluorine-containing resin particles (4) are produced as with the fluorine-containing resin particles (2) except that the fluorine-containing resin particles (3) are used instead of the fluorine-containing resin particles (1) used in producing the fluorine-containing resin particles (2).

Example 5

Preparation of Fluorine-Containing Resin Particles (5)

Into an autoclave, 3 L of deionized water, 3.0 g of ammonium perfluorooctanoate, and 120 g of paraffin wax (produced by Nippon Oil Corporation) serving as an emulsion stabilizer are charged, the interior of the system is substituted with nitrogen three times and with tetrafluoroethylene (TFE) twice to remove oxygen, and then stirring is performed at 250 rpm by adjusting the internal pressure to 1.0 MPa with TFE while maintaining the internal temperature at 70° C. Next, ethane in an amount equivalent to 150 cc at normal pressure serving as a chain transfer agent and 20 mL of an aqueous solution dissolving 300 mg of ammonium persulfate serving as a polymerization initiator are charged into the system, and the reaction is started. During the reaction, the temperature inside the system is maintained at 70° C., and TFE is continuously supplied so that the internal pressure of the autoclave is constantly maintained at 1.0±0.05 MPa. At the time 1000 g of TFE is consumed by the reaction after addition of the initiator, supply of TFE and stirring are stopped, and the reaction is terminated. Subsequently, particles are centrifugally separated, 400 parts by mass of methanol is taken, the mixture is washed for 10 minutes in a stirrer at 250 rpm while applying ultrasonic waves, and the supernatant is filtered. This operation is repeated three times, and the filtrate is dried at a reduced pressure at 60° C. for 17 hours.

Through the above-described steps, fluorine-containing resin particles (5) are produced.

Example 6

Preparation of Fluorine-Containing Resin Particles (6)

Fluorine-containing resin particles (6) are produced as with the fluorine-containing resin particles (5) except that 5 g of triethylamine is added after completion of the reaction in the production of the fluorine-containing resin particles (5).

Comparative Example 1

Preparation of Fluorine-Containing Resin Particles (C1)

Fluorine-containing resin particles (C1) are produced as with the fluorine-containing resin particles (1) except that, in producing the fluorine-containing resin particles (1), irradiation is performed in air.

Comparative Example 2

Preparation of Fluorine-Containing Resin Particles (C2)

Fluorine-containing resin particles (C2) are produced as with the fluorine-containing resin particles (2) except that the fluorine-containing resin particles (C1) are used instead of the fluorine-containing resin particles (1) used in producing the fluorine-containing resin particles (2).

Comparative Example 3

Preparation of Fluorine-Containing Resin Particles (C3)

Fluorine-containing resin particles (C3) are produced as with the fluorine-containing resin particles (6) except that in producing the fluorine-containing resin particles (6), the washing operation is performed once.
Evaluation
Various Measurements The following properties of the fluorine-containing resin particles are measured by the aforementioned methods.

The number of carboxyl groups (in the table, indicated as "COOH") per $10^6$ carbon atoms The amount of basic compound (ppm)

The amount of PFOA (ppb)
Actual Device Evaluation
Preparation of Photoreceptor

A photoreceptor is prepared as follows by using the obtained fluorine-containing resin particles.

One hundred parts of zinc oxide (average particle diameter: 70 nm, produced by Tayca Corporation, specific surface area: 15 m$^2$/g) is mixed with 500 parts of tetrahydrofuran, and 1.3 parts of a silane coupling agent (KBM503 produced by Shin-Etsu Chemical Co., Ltd.) is added thereto, followed by stirring for 2 hours. Then, tetrahydrofuran is distilled away by vacuum distillation, baking is performed at 120° C. for 3 hours, and, as a result, zinc oxide surface-treated with the silane coupling agent is obtained.

One hundred and ten parts of the surface-treated zinc oxide and 500 parts of tetrahydrofuran are mixed and stirred, a solution prepared by dissolving 0.6 parts of alizarin in 50 parts of tetrahydrofuran is added to the resulting mixture, and the resulting mixture is stirred at 50° C. for 5 hours. Subsequently, alizarin-doped zinc oxide is separated by vacuum filtration and vacuum-dried at 60° C. As a result, alizarin-doped zinc oxide is obtained.

Sixty parts of the alizarin-doped zinc oxide, 13.5 parts of a curing agent (blocked isocyanate, Sumidur 3175 produced by Sumitomo Bayer Urethane Co., Ltd.), 15 parts of a butyral resin (S-LEC BM-1 produced by Sekisui Chemical Co., Ltd.), and 85 parts of methyl ethyl ketone are mixed to obtain a mixed solution. Thirty eight parts of this mixed solution and 25 parts of methyl ethyl ketone are mixed, and the resulting mixture is dispersed for 2 hours in a sand mill using 1 mmΦ glass beads to obtain a dispersion.

To the obtained dispersion, 0.005 parts of dioctyltin dilaurate serving as a catalyst and 45 parts of silicone resin particles (Tospearl 145 produced by Momentive Performance Materials Japan LLC) are added to obtain an undercoat-layer-forming solution. The coating solution is applied to a cylindrical aluminum substrate, and dried and cured at 170° C. for 30 minutes so as to form an undercoat layer having a thickness of 22 μm.

Next, 1 part of hydroxygallium phthalocyanine having intense diffraction peaks at Bragg's angles (2θ±0.2° of 7.5°, 9.9°, 12.5°, 16.3°, 18.6°, 25.1°, and 28.3° in an X-ray diffraction spectrum, 1 part of polyvinyl butyral (S-LEC BM-S produced by Sekisui Chemical Co., Ltd.), and 80 parts of n-butyl acetate are mixed, and the resulting mixture is dispersed with glass beads in a paint shaker for 1 hour to prepare a charge-generating-layer-forming solution. The obtained solution is applied to the undercoat layer on the conductive support by dip-coating, and heated at 100° C. for 10 minutes to form a charge generating layer having a thickness of 0.15 μm.

In 350 parts of toluene and 150 parts of tetrahydrofuran, 45 parts of a benzidine compound represented by formula (CTM1) below serving as a charge transporting material and 55 parts of a polymer compound (viscosity-average molecular weight: 40,000) having a repeating unit represented by formula (PCZ1) below and serving as a binder resin are dissolved, 10 parts of the fluorine-containing resin particles and 1 part of a fluorine-containing dispersant (GF400 produced by Toagosei Co, Ltd.) are added to the resulting solution, and the resulting mixture is treated five times with a high-pressure homogenizer to prepare a charge generating layer-forming coating solution. The obtained coating solution is applied to the charge generating layer by dip-coating, and heated at 130° C. for 45 minutes to prepare a charge transporting layer having a thickness of 13 μm.

Photoreceptors are prepared through the steps described above.

Image Forming Apparatus for Evaluation

The obtained electrophotographic photoreceptor is attached to DocuCentre-VC7775 produced by Fuji Xerox Co., Ltd.

By using a surface potentiometer (Trek 334 produced by Trek Japan Co., Ltd.), a surface potential probe is installed at a position 1 mm remote from the surface of the photoreceptor and in the region to be measured.

This apparatus is used as the image forming apparatus for evaluation.

Evaluation of Chargeability

The chargeability of the obtained photoreceptor is evaluated as follows.

After the surface potential after charging is set to −700 V by using the image forming apparatus for evaluation, an full-page halftone image having an image density of 30% is output on 70,000 sheets of A4 paper in a high-temperature, high-humidity environment (temperature: 28° C., humidity: 85% RH). Then the surface potential is measured with a surface potentiometer and evaluated by the following evaluation standard:

5: The surface potential is −700 V or more and less than −690 V.
4: The surface potential is −690 V or more and less than −675 V.
3: The surface potential is −675 V or more and less than −660 V (practically acceptable level).
2: The surface potential is −660 V or more and less than −640 V.
1: The surface potential is −640 V or more.

Evaluation of Residual Potential

The residual potential of the obtained photoreceptors is evaluated as follows.

After the surface potential after charging is set to −700 V by using the image forming apparatus for evaluation, an full-page halftone image having an image density of 30% is output on 70,000 sheets of A4 paper in a high-temperature, high-humidity environment (temperature: 28° C., humidity: 85% RH).

The initial residual potential of the photoreceptor after outputting 100 sheets and after charge erasing, and the aged residual potential of the photoreceptor after outputting 70,000 sheets and after charge erasing are measured with a surface potentiometer, the difference (absolute value) is determined, and the following evaluation is made.

5: The difference in residual potential is less than 5 V.
4: The difference in residual potential is 5 V or more and less than 10 V.
3: The difference in residual potential is 10 V or more and less than 20 V (practically acceptable level).
2: The difference in residual potential is 20 V or more and less than 50 V.
1: The difference in residual potential is 50 V or more.

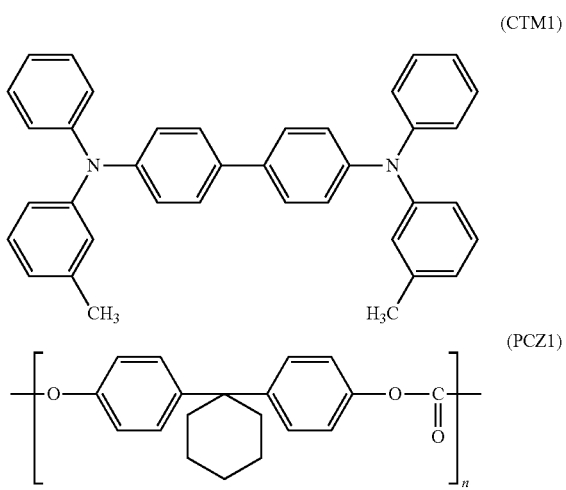

TABLE 1

| | Type of fluorine-containing resin particles | Amount of COOH (number) | Basic compound Type | Amount (ppm) | Amount of PFOA (ppb) | Evaluation Charge-ability | Residual potential |
|---|---|---|---|---|---|---|---|
| Example 1 | (1) | 15 | Triethylamine (boiling point: 89° C.) | 3 | 25 | 5 | 4 |
| Example 2 | (2) | 15 | Triethylamine (boiling point: 89° C.) | 1 | 5 | 4 | 4 |
| Example 3 | (3) | 30 | Triethylamine (boiling point: 89° C.) | 2 | 75 | 3 | 4 |
| Example 4 | (4) | 30 | Triethylamine (boiling point: 89° C.) | 0 | 0 | 4 | 5 |
| Example 5 | (5) | 7 | Ammonia (boiling point: room temperature or less) | 1 | 5 | 5 | 5 |
| Example 6 | (6) | 7 | Triethylamine (boiling point: 89° C.) | 3 | 5 | 5 | 3 |
| Comparative Example 1 | (C1) | 75 | Triethylamine (boiling point: 89° C.) | 4 | 200 | 1 | 2 |
| Comparative Example 2 | (C2) | 75 | Triethylamine (boiling point: 89° C.) | 1 | 5 | 2 | 5 |
| Comparative Example 3 | (C3) | 7 | Triethylamine (boiling point: 89° C.) | 10 | 15 | 4 | 2 |

The results described above indicate that satisfactory results are obtained for the evaluations of the chargeability and residual potential of the photoreceptors in Examples compared to Comparative Examples.

Thus, the fluorine-containing resin particles of this exemplary embodiment have excellent chargeability.

Note that, as indicated in Examples 1 and 2, as long as the number of carboxyl groups and the amount of the basic compounds are suppressed within the aforementioned ranges, even when the number of carboxyl groups is relatively large, the chargeability tends to improve by using a relatively large amount of the basic compounds since the ion conductivity and the hole-trapping property cancel out each other.

Examples 11 to 17 and Comparative Examples 11 and 12

Fluorine-containing resin particles indicated in Table 2 are used to prepare photoreceptors of Examples 11 to 17 and Comparative Examples 11 and 12 by the method described above.

However, the charge transporting material (CTM type) and the binder resin (in the table, indicated as "PC type") indicated in Table 2 are used in the charge transporting layer.

In Table 2, abbreviations are as follows.

BPZ1: polycarbonate resin described below (pm:pn=0.2: 0.8, viscosity-average molecular weight=55000)

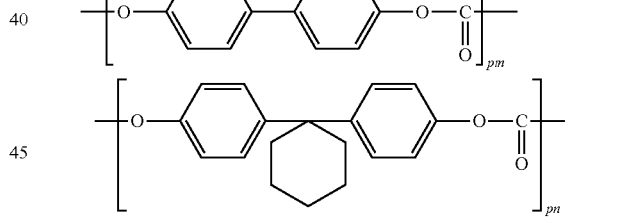

BPZ2: polycarbonate resin described below (pm:pn=0.3: 0.7, viscosity-average molecular weight=50000)

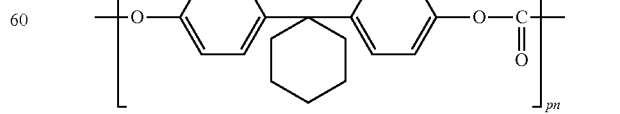

PCZ1: polycarbonate resin described below (viscosity-average molecular weight=40,000)

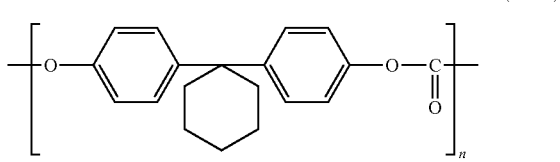

CTM1: compound described below

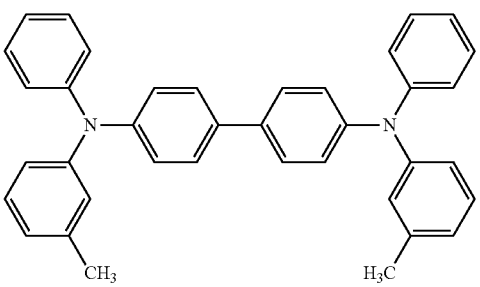

CTM2: compound described below (charge transporting material represented by structural formula (CT1A) (example compound (CT1-3))

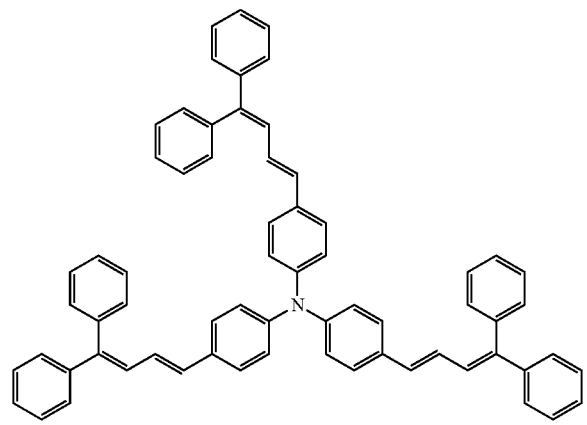 [SMILES: C(/C=C/c1ccc(N(c2ccc(/C=C/C=C(c3ccccc3)c3ccccc3)cc2)c2ccc(/C=C/C=C(c3ccccc3)c3ccccc3)cc2)cc1)=C(c1ccccc1)c1ccccc1]

Evaluation

The photoreceptors of Examples 11 to 17 and Comparative Examples 11 and 12 are evaluated as follows.

Dispersibility

The dispersibility of the fluorine-containing resin particles is evaluated by visual observation and the method described below.

A multilayer segment constituted by layers from the undercoat layer to the surface charge transporting layer 1 is cut out from each substrate of a photoreceptor of each example by using a single-edged trimming razor (produced by Nisshin EM Co., Ltd.) and is embedded in a photocurable acryl resin (product name: D-800 produced by JEOL Ltd. DATUM Business Operations). Next, the embedded segment is cut by a microtome method (microtome device produced by LEICA) with a diamond knife so as to expose a section of the multilayer segment. The section of the segment is observed with a laser microscope OLS-1100 produced by Olympus Optical Co., Ltd., under the condition of a step feed of 0.01 μm.

The evaluation standard is as follows.

A: Particles are uniformly dispersed under visual observation and laser microscope evaluation, and no aggregation is found.

B: Moderate aggregation is locally (an area of less than 5%) found under laser microscope evaluation, but the extent thereof is acceptable.

C: Aggregation is locally (an area of less than 10%) found under laser microscope evaluation, but the extent thereof does not pose any practical problem.

D: Extensive aggregation is found, and slight noise is generated at the time the machine is stopped.

E: Extensive aggregation is found throughout the entirety. Clear noise is generated at the time the machine is stopped.

Image Quality

The image quality (density nonuniformity of the granular image) is evaluated as follows.

A 50% halftone image is formed in an environment at a temperature of 28° C. and a humidity of 85%, and the image granularity is observed with naked eye and a magnifying lens.

The evaluation standard is as follows.

A: No density nonuniformity is found.

B: Density nonuniformity is found in some area (area less than 5%) under a magnifying lens, but the extent of the nonuniformity does not pose a practical problem.

C: Density nonuniformity is found in some area (area less than 10%) under a magnifying lens, but the extent of the nonuniformity does not pose a practical problem.

D: Density nonuniformity is found with naked eye (area equal to or less than 10%), and the extent of the nonuniformity poses an image quality problem in a high-image-quality machine such as a color machine.

E: Clear density nonuniformity is found with naked eye. The extent of the nonuniformity poses a practical problem.

Scratches

Scratches on the surface (surface of the charge transporting layer, which is the outermost surface layer) of the photoreceptor are evaluated as follows.

After an image is formed on 10,000 sheets in an environment at a temperature of 28° C. and a humidity of 85%, the surface of the photoreceptor is observed with naked eye and a microscope (digital microscope produced by KEYENCE CORPORATION, series no. VHX-700) at a magnification of 500×.

The evaluation standard is as follows.

A: No scratches are found on the photoreceptor surface.

B: Minute scratches are observed under a microscope.

C: Scratches are clearly observed under a microscope but are not visible with naked eye. The extent of the scratches poses no practical problem.

D: Minute scratches are observed with naked eye. The extent of the scratches poses an image quality problem.

E: Clear scratches can be observed with naked eye. The extent of the scratches poses an image quality problem.

TABLE 2

| | Type of fluorine-containing resin particles | Amount of COOH (number) | Basic compound Type | Amount (ppm) | Amount of PFOA (ppb) | PC type | CTM type | Evaluation Dispersibility | Image quality | Scratches |
|---|---|---|---|---|---|---|---|---|---|---|
| Example 11 | (3) | 30 | Triethylamine (boiling point: 89° C.) | 2 | 75 | BPZ1 | CTM2 | C | B | A |
| Example 12 | (5) | 7 | Ammonia (boiling point: room temperature or less) | 1 | 5 | BPZ2 | CTM2 | A | A | B |
| Example 13 | (1) | 15 | Triethylamine (boiling point: 89° C.) | 3 | 25 | BPZ1 | CTM2 | B | B | A |
| Example 14 | (5) | 7 | Ammonia (boiling point: room temperature or less) | 1 | 5 | BPZ1 | CTM2 | A | A | A |
| Example 15 | (1) | 15 | Triethylamine (boiling point: 89° C.) | 3 | 25 | BPZ2 | CTM1 | B | C | B |
| Comparative Example 11 | (C1) | 75 | Triethylamine (boiling point: 89° C.) | 4 | 200 | PCZ1 | CTM1 | D | D | C |
| Example 16 | (3) | 30 | Triethylamine (boiling point: 89° C.) | 2 | 75 | PCZ1 | CTM1 | C | C | C |
| Comparative Example 12 | (C1) | 75 | Triethylamine (boiling point: 89° C.) | 4 | 200 | BPZ1 | CTM2 | D | D | A |
| Example 17 | (1) | 15 | Triethylamine (boiling point: 89° C.) | 3 | 25 | PCZ1 | CTM1 | C | C | C |

The results described above indicate that, even when a polycarbonate resin that has a structural unit represented by general formula (PCA) and a structural unit represented by general formula (PCB) is used, the dispersibility of the fluorine-containing resin particles is high and the image quality (density nonuniformity of a granular image) is satisfactory as long as fluorine-containing resin particles having 0 or more and 30 or less carboxyl groups per $10^6$ carbon atoms are used. It can also be found that, in this manner, scratches on the surface (surface of the charge transporting layer which is the outermost surface layer) of the photoreceptor are reduced.

Examples 21 to 39

Preparation of Fluorine-Based Graft Polymer (1)

A fluorine-based graft polymer (1) is synthesized as follows.

Into a 500 mL reactor equipped with a stirrer, a reflux cooling duct, a thermometer, and a nitrogen gas inlet port, 5 parts by mass of methyl isobutyl ketone is placed and stirred, and the solution temperature inside the reactor in a nitrogen gas atmosphere is maintained at 80° C. A mixture solution containing 9 parts by mass of perfluorohexylethyl acrylate, 21 parts by mass of MACROMONOMER AA-6 (produced by Toagosei Co, Ltd.), 0.25 parts by mass of PERHEXYL O (produced by NOF CORPORATION) serving as a polymerization initiator, and 45 parts by mass of methyl isobutyl ketone is added to the reactor dropwise for 2 hours using a syringe dropping pump. After completion of dropwise addition, stirring is continued for two more hours, and then the solution temperature is increased to 90° C., followed by stirring for 2 hours.

To the methyl isobutyl ketone resin solution obtained after the reaction, 400 mL of methanol is added dropwise to precipitate a fluorine-based graft polymer. The precipitated solid component is filtered out and dried. As a result, 21.2 g of a fluorine-based graft polymer (1) is obtained.

Preparation of Fluorine-Based Graft Polymer (2)

The same synthesis as with the fluorine-based graft polymer (1) is performed except that, in synthesizing the fluorine-based graft polymer (1), the amount of PERHEXYL O is changed from 0.25 parts by mass to 0.2 parts by mass. As a result, 24.1 g of a fluorine-based graft polymer (2) is obtained.

Preparation of Fluorine-Based Graft Polymer (3)

The same synthesis as with the fluorine-based graft polymer (1) is performed except that, in synthesizing the fluorine-based graft polymer (1), PERHEXYL O is changed to PERBUTYL PV (produced by NOF CORPORATION). As a result, 19.8 g of a fluorine-based graft polymer (3) is obtained.

Preparation of Fluorine-Based Graft Polymer (4)

The same synthesis as with the fluorine-based graft polymer (1) is performed except that, in synthesizing the fluorine-based graft polymer (1), the amount of perfluorohexylethyl acrylate is changed from 9 parts by mass to 11 parts by mass, and the amount of MACROMONOMER AA-6 is changed from 21 parts by mass to 19 parts by mass. As a result, 23 g of a fluorine-based graft polymer (4) is obtained.

Preparation of Fluorine-Based Graft Polymer (5)

The same synthesis as with the fluorine-based graft polymer (1) is performed except that, in synthesizing the fluorine-based graft polymer (1), the amount of perfluorohexylethyl acrylate is changed from 9 parts by mass to 11 parts by mass, the amount of MACROMONOMER AA-6 is changed from 21 parts by mass to 19, and the amount of methyl isobutyl ketone is changed from 45 parts by mass to 40 parts by mass. As a result, 20.2 g of a fluorine-based graft polymer (5) is obtained.

Preparation of Fluorine-Based Graft Polymer (6)

The same synthesis as with the fluorine-based graft polymer (1) is performed except that, in synthesizing the fluorine-based graft polymer (1), the amount of methyl isobutyl ketone is changed from 45 parts by mass to 60 parts by mass. As a result, 21.5 g of a fluorine-based graft polymer (6) is obtained.

Preparation of Fluorine-Based Graft Polymer (7)

The same synthesis as with the fluorine-based graft polymer (1) is performed except that, in synthesizing the fluorine-based graft polymer (1), the amount of PERHEXYL O is changed from 0.25 parts by mass to 0.2 parts by mass, and the stirring time after completion of the dropwise addition is changed from 2 hours to 5 hours. As a result, 24 g of a fluorine-based graft polymer (7) is obtained.

Preparation of Fluorine-Based Graft Polymer (8)

The same synthesis as with the fluorine-based graft polymer (1) is performed except that, in synthesizing the fluorine-based graft polymer (1), perfluorohexylethyl acrylate is changed to perfluorobutylethyl acrylate. As a result, 17 g of a fluorine-based graft polymer (8) is obtained.

Preparation of Fluorine-Based Graft Polymer (C1)

To 150 g (solid content: 25 wt %) of a fluorine-based graft polymer "GF400 (produced by Toagosei Co, Ltd.)", 400 g of methanol is added dropwise, and the precipitated fluorine-based graft polymer is filtered out and dried. As a result, 31 g of a fluorine graft polymer is obtained.

This purified product is used as a fluorine-based graft polymer (C1).

Preparation of Fluorine-Based Graft Polymer (C2)

From 50 g of a fluorine-based graft polymer "GF400 (produced by Toagosei Co, Ltd.)", a solvent is distilled away. As a result, 12.6 g of a fluorine graft polymer is obtained.

This polymer is used as a fluorine-based graft polymer (C2).

Preparation of Fluorine-Based Graft Polymer (C3)

The same synthesis as with the fluorine-based graft polymer (1) is performed except that, in synthesizing the fluorine-based graft polymer (1), the solvent is distilled away without purification by addition of 400 mL of methanol after the reaction. As a result, 26 g of a fluorine-based graft polymer (C3) is obtained.

Preparation of Fluorine-Based Graft Polymer (C4)

To 250 mL of hexane, 50 g of a fluorine-based graft polymer "LE-604 (produced by KYOEISHA CHEMICAL Co., LTD.)" is added dropwise, and the precipitated fluorine-based graft polymer is filtered out and purified.

This purified product is used as a fluorine-based graft polymer (C4).

Preparation of Fluorine-Based Graft Polymer (C5)

The same synthesis as with the fluorine-based graft polymer (1) is performed except that, in synthesizing the fluorine-based graft polymer (1), the amount of perfluorohexylethyl acrylate is changed from 9 parts by mass to 16 parts by mass, and the amount of MACROMONOMER AA-6 is changed from 21 parts by mass to 14 parts by mass. As a result, 14 g of a fluorine-based graft polymer (C5) is obtained.

Photoreceptors of Examples 21 to 39 are prepared as with the photoreceptor of Example 1 except that the obtained respective fluorine-based graft polymers are used as the fluorine-containing dispersant.

Evaluation

Various Measurements

The following properties of the fluorine-based graft polymers are measured by the aforementioned methods.

Peak area ratio (peak area in the wavenumber range of $1020$ $cm^{-1}$ to $1308$ $cm^{-1}$/peak area in the wavenumber range of $1673$ $cm^{-1}$ to $1779$ $cm^{-1}$) (in the table, indicated as "Peak area ratio F/C=O") in an infrared absorption spectrum Weight-average molecular weight Mw Evaluation of Dispersion Stability (Centrifugal Separation Test) of Fluorine-Containing Resin Particles The dispersion stability (centrifugal separation test) of fluorine-containing resin particles is evaluated as follows.

Dispersion coating solutions are prepared by using the types and amounts of the fluorine-containing resin particles and the fluorine-based graft polymers indicated in Table 1 as with preparation of the coating solution for forming a charge transporting layer of an electrophotographic photoreceptor 1.

This dispersion coating solution is placed in a 1.5 mL sample tube and centrifugally separated in a centrifugal separator at a rate of 6000 rotations per minute for 5 minutes.

The dispersion stability is evaluated with naked eye according to the following evaluation standard.

A++: The interior of the sample tube is entirely opaque, and settling of the fluorine-containing resin fine particles is not observed.

A+: The interior of the sample tube is entirely opaque, but there is a slight difference in density between a top portion and a bottom portion. However, the extent thereof does not pose any problem.

A: The interior of the sample tube is entirely opaque, but deposits of fluorine-containing resin particles are slightly visible. However, the extent thereof is acceptable.

B: The interior of the sample tube is rather transparent, and deposits of the fluorine-containing resin particles are clearly present at the bottom portion. The dispersion stability is poor.

C: The interior of the sample tube is entirely transparent, and most of deposits of fluorine-containing resin particles are present at the bottom portion. The dispersion stability is poor.

Evaluation of Cleaning Property

The cleaning property of the photoreceptor is evaluated as follows.

The photoreceptors of respective examples are loaded onto an image forming apparatus (trade name: ApeosPort-IVC3375 produced by Fuji Xerox Co., Ltd.). With this apparatus, a halftone mage having an image density of 5% is formed on sheets of A4 paper (210×297 mm, P paper produced by Fuji Xerox Co., Ltd.) in a high-temperature, high-humidity environment (28° C., 85 RH %) until the cumulative number of rotations of the photoreceptor reaches 100,000 cycles. Then, a halftone mage having an image density of 50% is continuously output on 20 sheets, and the twentieth sheet is observed with naked eye to check whether image defects, such as streaks, have occurred.

The evaluation standard is as follows.

A+: No image quality problem.

A: Minor streak-like defects are found, but the image quality is acceptable.

B: Clear streak-like defects are found, and the extent of the defects poses a problem.

C: Streak-like defects are found throughout the entirety, and the extent of the defects poses a problem.

TABLE 3

| Type | Fluorine-based graft polymer | |
|---|---|---|
| | Peak area ratio F/C=O | Mw |
| (1) Synthesized product | 2.9 | 68000 |
| (2) Synthesized product | 3.7 | 93000 |
| (3) Synthesized product | 3.8 | 63000 |
| (4) Synthesized product | 3.9 | 35300 |
| (5) Synthesized product | 4.8 | 76800 |
| (6) Synthesized product | 4.0 | 52200 |
| (7) Synthesized product | 2.7 | 140400 |
| (8) Synthesized product | 2.9 | 91800 |
| (C1) GF400 Purified product | 2.6 | 124700 |
| (C2) GF400 Solid component | 2.1 | 99000 |
| (C3) Synthesized product | 2.6 | 61000 |
| (C4) LE604 Purified product | 1.4 | 31000 |
| (C5) Synthesized product | 5.0 | 40000 |

TABLE 4

| | Fluorine-containing resin particles Type | Fluorine-based graft polymer Type | Evaluation | |
|---|---|---|---|---|
| | | | Dispersion stability | Cleaning property |
| Example 21 | (1) | (1) Synthesized product | A+ | A |
| Example 22 | (1) | (2) Synthesized product | A | A+ |
| Example 23 | (1) | (3) Synthesized product | A | A+ |
| Example 24 | (1) | (4) Synthesized product | A | A+ |
| Example 25 | (1) | (5) Synthesized product | A | A+ |
| Example 26 | (1) | (6) Synthesized product | A | A+ |
| Example 27 | (1) | (7) Synthesized product | A | A+ |
| Example 28 | (1) | (8) Synthesized product | A | A |
| Example 29 | (2) | (1) Synthesized product | A | A |
| Example 30 | (3) | (2) Synthesized product | A | A+ |
| Example 31 | (4) | (5) Synthesized product | A+ | A+ |
| Example 32 | (6) | (1) Synthesized product | A+ | A+ |
| Example 33 | (1) | (C1) GF400 Purified product | B | B |
| Example 34 | (1) | (C2) GF400 Solid component | C | B |
| Example 35 | (1) | (C3) Synthesized product | C | B |
| Example 36 | (1) | (C4) LE604 Purified product | C | B |
| Example 37 | (1) | (C5) Synthesized product | B | B |
| Example 38 | (1) | (C1) GF400 Purified product | B | C |
| Example 39 | (1) | (C1) GF400 Purified product | C | C |

The above-described results indicates that, compared to Examples 33 to 39, Examples 21 to 32 that use the particular fluorine-based graft polymer offer better fluorine-containing resin particle dispersion stability and cleaning property.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A fluorine-containing resin particle comprising:

7 or more and 30 or less carboxyl groups per $10^6$ carbon atoms; and 0 ppm or more and 3 ppm or less of a basic compound, wherein the fluorine-containing resin particles are selected from the group consisting of polytetrafluoroethylene (PTFE) particles, tetrafluoroethylene-hexafluoropropylene copolymer (FEP) particles, tetrafluoroethylene-perfluoro(alkyl vinyl ether) copolymer (PFA) particles, ethylene-tetrafluoroethylene copolymer (ETFE) particles, and ethylene-chlorotrifluoroethylene copolymer (ECTFE) particles, and wherein the basic compound is an amine compound.

2. The fluorine-containing resin particle according to claim 1, comprising:

7 or more and 20 or less carboxyl groups per $10^6$ carbon atoms.

3. The fluorine-containing resin particle according to claim 1, comprising:

7 or more and 20 or less carboxyl groups per $10^6$ carbon atoms; and 0 ppm or more and 1.5 ppm or less of the basic compound.

4. The fluorine-containing resin particle according to claim 1, wherein the amine compound has a boiling point of 40° C. or more and 130° C. or less.

5. The fluorine-containing resin particle according to claim 1, comprising 0 ppb or more and 25 ppb or less of perfluorooctanoic acid.

6. The fluorine-containing resin particle according to claim 5, comprising 0 ppb or more and 20 ppb or less of perfluorooctanoic acid.

7. The fluorine-containing resin particle according to claim 1, wherein the fluorine-containing resin particle is obtained without performing irradiation during a production process.

8. A composition comprising:

fluorine-containing resin particles;

a binder resin; and a charge transporting material, wherein the fluorine-containing resin particles comprise:

0 or more and 30 or less carboxyl groups per $10^6$ carbon atoms, and 0 ppm or more and 3 ppm or less of a basic compound.

9. The composition according to claim 8, wherein the composition is liquid or solid.

10. A layer-shaped article comprising the fluorine-containing resin particle according to claim 1.

11. The fluorine-containing resin particle according to claim 1, wherein an average particle diameter of the fluorine-containing resin particle is from 0.2 μm to 4.5 μm, a BET specific surface area of the fluorine-containing resin particle is from 5 m$^2$/g to 15 m$^2$/g, and an apparent density of the fluorine-containing resin particle is from 0.2 g/ml to 0.5 g/ml.

12. The fluorine-containing resin particle according to claim 1, wherein the fluorine-containing resin particle has a fluorine atom-containing dispersant attached to a surface thereof.

13. The fluorine-containing resin particle according to claim 12, wherein the fluorine-containing dispersant is a fluorinated alkyl group-containing polymer having a structural unit represented by formula (FA) below:

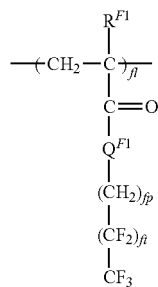

(FA)

wherein, in formulae (FA), each $R^{F1}$ independently represents a hydrogen atom or an alkyl group, each $Q^{F1}$ independently represents —O— or —NH—, fl represents an integer of 1 or more, each fp independently represents 0 or an integer of 1 or more, and each ft independently represents an integer of 1 or more and 7 or less.

14. The composition according to claim 8, comprising:

7 or more and 20 or less carboxyl groups per $10^6$ carbon atoms;

0 ppm or more and 1.5 ppm or less of the basic compound; and 0 ppb or more and 20 ppb or less of perfluorooctanoic acid, wherein the fluorine-containing resin particles are selected from the group consisting of polytetrafluoroethylene (PTFE) particles, tetrafluoroethylene-hexafluoropropylene copolymer (FEP) particles, tetrafluoroethylene-perfluoro(alkyl vinyl ether) copolymer (PFA) particles, ethylene-tetrafluoroethylene copolymer (ETFE) particles, and ethylene-chlorotrifluoroethylene copolymer (ECTFE) particles, and wherein the basic compound is an amine compound.

* * * * *